United States Patent [19]
Imaseki et al.

[11] Patent Number: 5,453,930
[45] Date of Patent: Sep. 26, 1995

[54] DRIVE SYSTEM FOR ELECTRIC AUTOMOBILES

[75] Inventors: Takashi Imaseki; Yuichi Fukuyama; Masato Fukino; Masato Origuchi, all of Kanagawa, Japan

[73] Assignee: Nissan Motor Co., Ltd., Yokohama, Japan

[21] Appl. No.: 998,974

[22] Filed: Dec. 30, 1992

Related U.S. Application Data

[63] Continuation-in-part of Ser. No. 833,251, Feb. 7, 1992, abandoned.

[30] Foreign Application Priority Data

Feb. 8, 1991 [JP] Japan ......................................... 3-17337
Feb. 7, 1992 [JP] Japan ......................................... 4-021557

[51] Int. Cl.⁶ .............................. B60L 15/20; B60L 11/18; B60K 1/02
[52] U.S. Cl. .................................. 364/424.01; 364/424.05; 180/65.3; 180/65.8; 318/139
[58] Field of Search .................... 364/424.01, 424.05, 364/425; 280/65.1, 65.2, 65.3, 65.5, 65.6, 65.8, 907; 318/139, 432, 433, 434

[56] References Cited

U.S. PATENT DOCUMENTS

| | | | |
|---|---|---|---|
| 3,297,926 | 1/1967 | Campbell et al. | 180/65.8 X |
| 4,223,255 | 9/1980 | Goldman et al. | 318/138 |
| 4,983,897 | 1/1991 | Tennant | 318/434 X |
| 5,101,924 | 4/1992 | Yamagiwa et al. | 180/65.8 X |
| 5,164,903 | 11/1992 | Lin et al. | 364/426.03 |
| 5,166,584 | 11/1992 | Fukino et al. | 318/139 |
| 5,222,568 | 6/1993 | Higasa et al. | 180/65.5 |
| 5,289,890 | 3/1994 | Toyoda et al. | 180/65.8 |
| 5,294,871 | 3/1994 | Imaseki | 318/139 |
| 5,343,971 | 9/1994 | Heidelberg et al. | 318/139 X |

FOREIGN PATENT DOCUMENTS 56-132102  10/1981  Japan.
62-138002   6/1987  Japan.

Primary Examiner—Kevin J. Teska
Assistant Examiner—Collin W. Park
Attorney, Agent, or Firm—Pennie & Edmonds

[57] ABSTRACT

A wheel motor drive system for electric automobiles comprises a car battery mounted on a vehicle body, at least two electric motors connected to vehicle wheels independently of each other, each of the motors having inherent torque characteristics with regard to a rotational speed and a maximum torque, sensors for monitoring a vehicle travelling condition, and a controller responsive to the vehicle travelling condition and the torque characteristics of the motors for controlling the motors at a low power consumption mode wherein at least one of the motors is driven within a high motor efficiency range so as to assure a long travel distance per one battery discharge.

12 Claims, 14 Drawing Sheets

DRIVE SYSTEM FOR ELECTRIC AUTOMOBILES

This is a continuation-in-part of application Ser. No. 07/833,251, filed Feb. 7, 1992, now abandoned.

BACKGROUND OF THE INVENTION

1. Field of the Invention

The present invention relates to a wheel motor drive system for electric automobiles, and more specifically to a drive system which is capable of providing an energy-saving driving mode for drive motors connected to vehicle wheels.

2. Description of the Background Disclosure

In recent years, there have been proposed and developed various electric automobiles employing at least one electric motor. Such electric automobiles have been disclosed in Japanese Patent First Publications Tokkai (Showa) 56-132102 and 62-138002, the former being a hybrid driving system in which both an internal combustion engine and an electric motor are provided for driving vehicle wheels, and the latter being a wheel motor drive system in which two same motors are connected to left and right wheels for driving these wheels independently of each other. In the former system, the wheels are driven by the internal combustion engine within a particular driving torque range wherein a relatively high combustion efficiency of the engine is obtained, and also driven by the electric motor within the other torque range. In the latter system, the left and right motors are controlled independently of each other, such that both motors are simultaneously driven with the same rotational speed during a straight driving of the vehicle, and the rotational speed of the outer wheel is set to be greater than that of the inner wheel on the basis of a monitored steering angle and rotational speeds of motors during a left or right turn, with the result that the outer wheel travels farther than the inner wheel. Such a motor driving control for the wheel motor drive system functions as a differential gear which allows vehicle wheels to rotate by different amounts when the vehicle rounds a turn.

In the previously noted Japanese Patent First Publication No. 56-132102, since one of the internal combustion engine and the motor, which are connected to each other through a one-way clutch, is selected to drive the wheels in consideration of a desired high combustion efficiency of the engine, there is a possibility that the wheels would be driven by the motor even at a relatively high torque range wherein the engine exhibits a low combustion efficiency. To permit this, a high-power motor is required. As is well known, an efficiency of an electric motor is relatively low, such as 60% or less, when the rotational speed of the motor is low or when an output torque required for the motor is low. Therefore, as the maximum output torque of the motor is greater, the efficiency of the motor is deteriorated during a low-load travelling of the vehicle, such as a constant speed travelling, since the difference between the maximum torque and the required torque becomes greater. This results in a relatively short travel distance of the vehicle in one discharge cycle according to which the car battery condition is changed from a fully charged state to a completely discharged state. Under these constructions, if the vehicle is held at a low vehicle speed so as to lower a travel resistance thereof, the output torque required for the motor becomes lower, with the result that the above torque difference becomes greater and the motor efficiency is considerably lowered.

In the above mentioned Japanese Patent First Publication No. 62-138002, there is a drawback of providing a relatively low motor efficiency during the low-load travelling, since the identical, left and right motors are utilized and simultaneously driven at the same rotational speed during a straight driving of the vehicle.

SUMMARY OF THE INVENTION

It is, therefore, in view of the above disadvantages, an object of the present invention to provide a drive system for electric automobiles which can provide a high efficiency of an electric motor employed therein, irrespective of a vehicle running condition, such as a low-load travelling, a low-speed travelling or the like.

It is another object of the invention to provide a compact arrangement of a wheel drive motor system for electric automobiles, in which at least two different motors are selectively or simultaneously driven so as to provide a high motor efficiency.

It is a further object of the invention to provide a wheel motor drive system for an electric automobile employing a plurality of electric motors which can provide an energy-saving driving mode for the motors.

It is a still further object of the invention to provide a wheel motor drive system for electric automobiles which can reliably provide a relatively long travel distance per one battery discharge cycle.

It is another object of the invention to provide a wheel motor drive system for an electric automobile employing a plurality of electric motors which can keep power loss of each of the motors at minimum and reliably prevent the motor from being overloaded.

It is another object of the invention to provide a drive system for an electric automobile employing a front-wheel drive motor and a rear-wheel drive motor which can inhibit a torque distribution wherein a torque output by the rear-wheel drive motor exceeds a torque output by the front-wheel drive motor, during travelling on slow frictional road.

It is another object of the invention to provide a drive system for an electric automobile employing an outer-wheel drive motor and an inner-wheel drive motor which can inhibit a torque distribution wherein a torque output by the outer-wheel drive motor exceeds a torque output by the inner-wheel drive motor, on turns on a low frictional road.

It is a further object of the invention to provide a wheel motor drive system for an electric automobile employing a plurality of electric motors which can prevent the driven wheel from skidding under an undesirable road surface condition, such as a low frictional road, so as to enhance a driving stability of the vehicle, during acceleration.

It is a still further object of the invention to provide a wheel motor drive system for an electric automobile employing a plurality of electric motors which can enhance a cornering stability of the vehicle under an undesirable road surface condition, such as a low frictional road, on turns.

In order to accomplish the aforementioned and other objects, a drive system for an electric automobile, comprises a car battery mounted on a vehicle body, at least two electric motors connected to vehicle wheels independently of each other, sensor means for monitoring a vehicle travelling condition, means for deriving a required driving torque to be generated by the motors on the basis of the monitored vehicle travelling condition, and control means responsive to the magnitude of the required torque, for drivingly controlling the motors at a low power consumption mode wherein at least one of the motors is driven within a high motor efficiency range while generating the required torque.

According to another aspect of the invention, a drive system for an electric automobile, comprises a car battery mounted on a vehicle body, at least two electric motors connected to vehicle wheels independently of each other, each of the motors having inherent torque characteristics with regard to a rotational speed and a maximum torque, sensor means for monitoring a vehicle travelling condition, memory means for storing torque characteristic data representative of the torque characteristics of the motors, means for deriving a required driving torque to be generated by the motors on the basis of the monitored vehicle travelling condition and the torque characteristic data, and control means responsive to the magnitude of the required torque, for controlling the motors at a low power consumption mode wherein at least one of the motors is driven within a high motor efficiency range while generating the required torque. The control means may include decision means for determining whether the required torque exceeds the maximum torque of each of the motors to generate a decision instruction and command means for controlling a power-supply to each of the motors in response to the decision instruction, so as to de-energize or energize each of the motors with a controlled electric power based on the magnitude of the required torque.

According to a further aspect of the invention, a wheel motor drive system for an electric automobile, comprises a car battery mounted on a vehicle body, a front-wheel drive motor having a driving connection with a front vehicle wheel, a rear-wheel drive motor having a driving connection with a rear vehicle wheel, torque characteristics of the rear-wheel drive motor being different from those of the front-wheel drive motor, sensor means for monitoring a vehicle travelling condition, memory means for storing torque characteristic data representative of the torque characteristics of the motors, means for deriving a required driving torque to be generated by the motors on the basis of the monitored vehicle travelling condition and the torque characteristic data, control means responsive to the magnitude of the required torque, for controlling the motors at a low power consumption mode wherein at least one of the motors is driven within a high motor efficiency range while generating the required torque, and the control means selecting one of three motor drive modes, namely a first drive mode wherein only the rear-wheel drive motor is driven, a second drive mode wherein only the front-wheel drive motor is driven, and a third drive mode wherein both the front-wheel and rear-wheel drive motors are driven simultaneously with each other. The control means may include decision means for determining whether the required torque exceeds the maximum torque of each of the motors to generate a decision instruction and command means for controlling a power-supply to each of the motors in response to the decision instruction, so as to de-energize or energize each of the motors with a controlled electric power based on the magnitude of the required torque. The sensor means may include a vehicle speed sensor for monitoring a vehicle speed and an accelerator sensor for monitoring a depressing amount of an accelerator-pedal, and the deriving means derives the required torque based on the monitored accelerator-pedal depressing amount and the maximum torque generated by each of the motors at the monitored vehicle speed. One of the motors is a high-power motor and the other is a low-power motor. The command means provides the first drive mode when the required torque is less than the maximum torque of the low-power motor, the second drive mode when the required torque is equal to or greater than the maximum torque of the low-power motor and less than the maximum torque of the high-power motor, and the third drive mode when the required torque is equal to or greater than the maximum torque of the high-power motor.

According to a still further aspect of the invention, a wheel motor drive system for an electric automobile, comprises a car battery mounted on a vehicle body, a left-wheel drive motor having a driving connection with a left vehicle wheel serving as a steered wheel, a right-wheel drive motor having a driving connection with a right vehicle wheel serving as a steered wheel, each of the motors having inherent torque characteristics with regard to a rotational speed and a maximum torque, sensor means for monitoring a vehicle travelling condition, the sensor means including a left-wheel drive motor speed sensor for monitoring a rotational speed of the left-wheel drive motor, a right-wheel drive motor speed sensor for monitoring a rotational speed of the right-wheel drive motor, an accelerator sensor for monitoring a depressing amount of an accelerator-pedal, and a steering angle sensor for monitoring a steering angle, memory means for storing torque characteristic data representative of the torque characteristics of the motors, a criterion data necessary to determine whether the vehicle is in an essentially straight driving state, and electric power consumption characteristic data of the motors, means for deriving a first required driving torque to be generated by the left-wheel drive motor and a second required driving torque to be generated by the right-wheel drive motor on the basis of the accelerator-pedal depressing amount and the maximum torque generated by each of the motors at the monitored rotational speed, the deriving means deriving a first multiple torque obtained by multiplying the first required torque by the number of the motors, a second multiple torque obtained by multiplying the second required torque by the same, and control means responsive to electric power consumptions of the motors for selecting one of two drive modes, namely a first drive mode wherein the motors are simultaneously driven in such a manner as to generate the first required torque by the left-wheel drive motor and to generate the second required torque by the right-wheel drive motor, and a second drive mode wherein the motors are driven alternately to each other at a designated period of time in such a manner as to generate the first multiple torque by the left-wheel drive motor and to generate the second multiple torque by the right-wheel drive motor. The deriving means derives a first electric power consumption consumed by the motors at the first drive mode and a second electric power consumption consumed by the motors at the second drive mode. The control means operates the motors such that the motors are driven at the second drive mode only when the steering angle is within the criterion, and the first multiple torque is less than the maximum torque of the left-wheel drive motor and the second multiple torque is less than the maximum torque of the right-wheel drive motor, and the first electric power consumption exceeds the second electric power consumption. The control means includes decision means for determining whether the first and second multiple torques respectively exceed the maximum torques of the motors and whether the first electric power consumption exceeds the second electric power consumption to generate a decision instruction and command means for controlling a power-supply to each of the motors in response to the decision instruction, so as to de-energize or energize each of the motors with a controlled electric power based on the magnitudes of the first and second required torques or the magnitudes of the first and second multiple torques. The designated period of time is determined to allow a substantially straight driving of the vehicle without yawing.

According to another aspect of the invention, a wheel motor drive system for an electric automobile, comprises a car battery mounted on a vehicle body, at least two electric motors connected to vehicle wheels independently of each other, sensor means for monitoring a vehicle travelling condition, means for deriving a required driving torque to be generated by the motors on the basis of the monitored vehicle travelling condition, means for detecting a load applied to each of the motors, means for comparing the magnitude of load applied to one of the motors with the magnitude of load applied to the other motor to generate a comparison result indicative signal, control means responsive to the magnitude of the required torque, for controlling the motors at a low power consumption mode wherein at least one of the motors is driven within a high motor efficiency range while generating the required torque, and the control means including decision means for determining whether the required torque exceeds a maximum torque of each of the motors to generate a decision instruction and command means for controlling a power-supply to each of the motors in response to the decision instruction and the comparison result indicative signal, so as to de-energize or energize each of the motors with a controlled electric power based on the magnitude of the required torque. The wheel motor drive system may further comprise means for monitoring a road surface condition to generate a road surface condition indicative signal, the command means controlling a power-supply to each of the motors in response to both the decision instruction and the road surface condition indicative signal. The control means controls the motors in response to the road surface condition indicative signal representing that the vehicle skids easily under the monitored road surface condition, in such a manner as to provide little torque difference between a torque generated by one of the motors and a torque generated by the other motor, so as to reduce a yawing rate of the vehicle, during acceleration.

According to a further aspect of the invention, a wheel motor drive system for an electric automobile, comprises a car battery mounted on a vehicle body, at least two electric motors connected to vehicle wheels independently of each other, sensor means for monitoring a vehicle travelling condition, means for deriving a required driving torque to be generated by the motors on the basis of the monitored vehicle travelling condition, means for monitoring a road surface condition to generate a road surface condition indicative signal, control means responsive to the magnitude of the required torque, for controlling the motors at a low power consumption mode wherein at least one of the motors is driven within a high motor efficiency range while generating the required torque, and the control means including decision means for determining whether the required torque exceeds a maximum torque of each of the motors to generate a decision instruction and command means for controlling a power-supply to each of the motors in response to the decision instruction and the road surface condition indicative signal, so as to de-energize or energize each of the motors with a controlled electric power based on the magnitude of the required torque.

According to a still further aspect of the inventions, a wheel motor drive system for an electric automobile, comprises a car battery mounted on a vehicle body, a left-wheel drive motor having a driving connection with a left vehicle wheel, a right-wheel drive motor having a driving connection with a right vehicle wheel, each of the motors being comprised of an identical rated motor having essentially identical torque characteristics with regard to a rotational speed and a maximum torque, sensor means for monitoring a vehicle travelling condition, the sensor means including a steering angle sensor generating a steering angle indicative signal, memory means for storing torque characteristic data representative of the torque characteristics of the motors, a predetermined criterion data necessary to determine whether the vehicle is turned to the right or left, means for deriving a required driving torque to be generated by the motors on the basis of the monitored vehicle travelling condition and the torque characteristic data, means for monitoring a road surface condition to generate a road surface condition indicative signal, control means responsive to the magnitude of the required torque, for drivingly controlling the motors at a low power consumption mode wherein at least one of the motors is driven within a high motor efficiency range while generating the required torque, and the control means including decision means for determining whether the required torque exceeds a maximum torque of each of the motors to generate a first decision instruction and for determining whether the vehicle is turned to the right or left to generate a second decision instruction based on the steering angle indicative signal, command means for controlling a power-supply to each of the motors in response to the first and second decision instructions and the road surface condition indicative signal, so as to de-energize or energize each of the motors with a controlled electric power based on the magnitude of the required torque, and means responsive to the road surface condition indicative signal representing that the vehicle skids easily under the monitored road surface condition, for inhibiting a particular torque distribution wherein a torque generated by one of the motors serving as an outer-wheel drive motor exceeds a torque generated by the other motor serving as an inner-wheel drive motor. The control means controls the motors in response to the road surface condition indicative signal representing that the vehicle skids easily under the monitored road surface condition, in such a manner as to provide little torque difference between the torque generated by the outer-wheel drive motor and the torque generated by the inner-wheel drive motor, so as to reduce a yawing rate of the vehicle, on turns.

DESCRIPTION OF THE PREFERRED EMBODIMENTS

First embodiment

Figure 1:
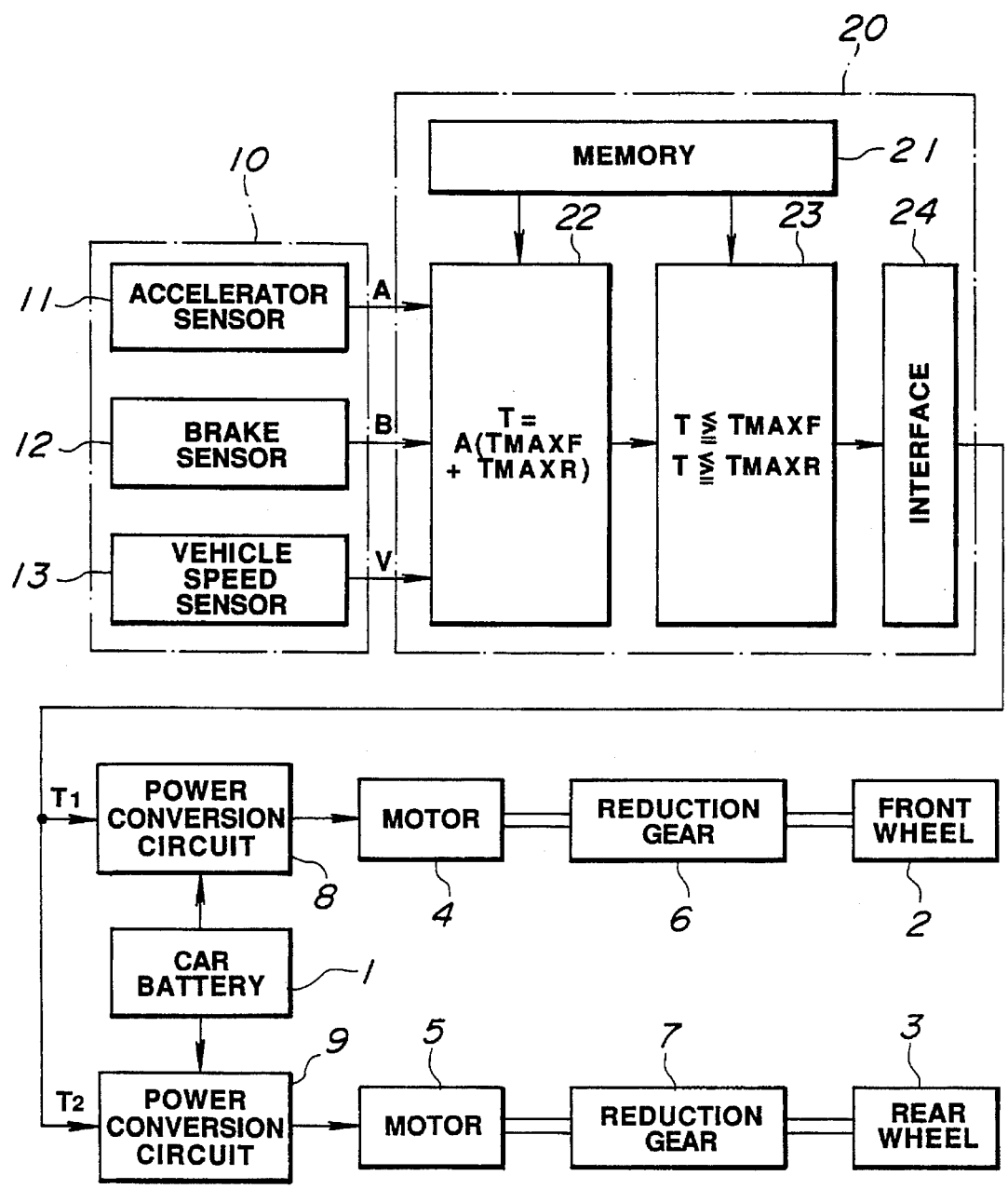
FIG. 1 is a block diagram illustrating a first embodiment of a wheel motor drive system for electric automobiles according to the invention.

Referring now to the drawings, particularly to FIG. 1, there is shown a wheel motor drive system for electric automobiles according to the invention. The wheel motor drive system comprises a front-wheel drive motor 4 connected through a reduction gear 6 to a front wheel 2 and a rear-wheel drive motor 5 connected through a reduction gear 7 to a rear wheel 3, a first power conversion circuit 8 provided for connecting and disconnecting the front-wheel drive motor 4 to and from a car battery 1 mounted on the vehicle body, and a power conversion circuit 9 provided for connecting and disconnecting the rear-wheel drive motor 5 to and from the battery. The battery 1 is made up of a plurality of battery cells. For example, a 12-volt battery is comprised of six 2-volt cells connected in series to each other so that voltages add up to the 12-volt total. In electric automobiles, a plurality of lead storage batteries are generally mounted on the vehicle body and combined with each other so as to provide a designated electric power.

Figure 2:
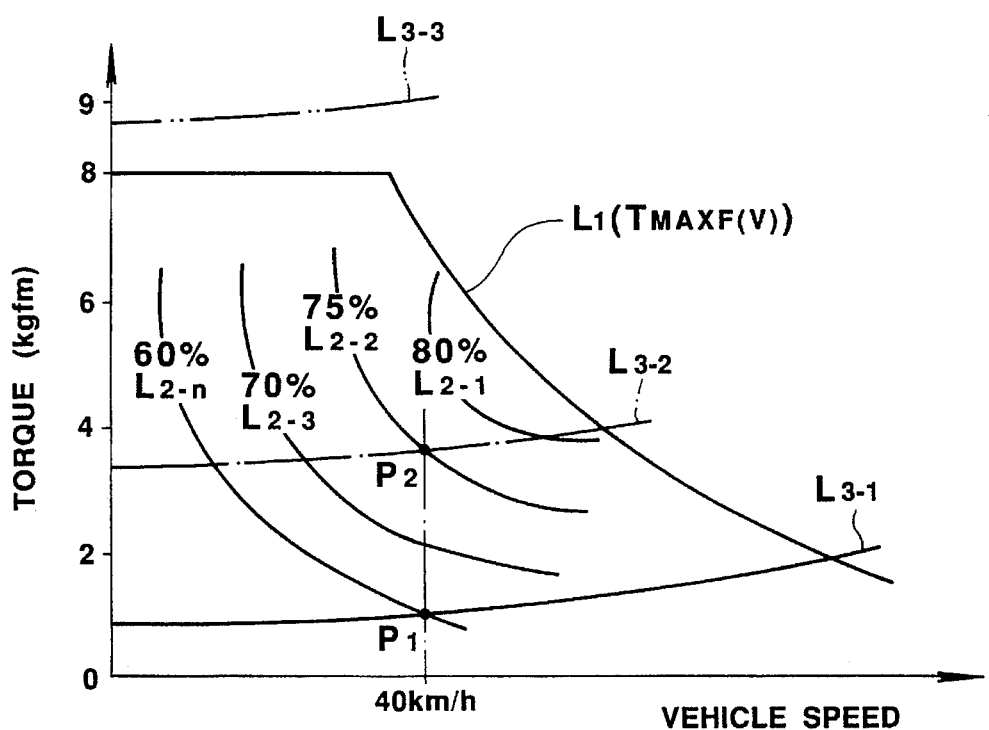
FIG. 2 is a graph illustrating characteristic curves of a high-power motor employed to drive front wheels.
Figure 3:
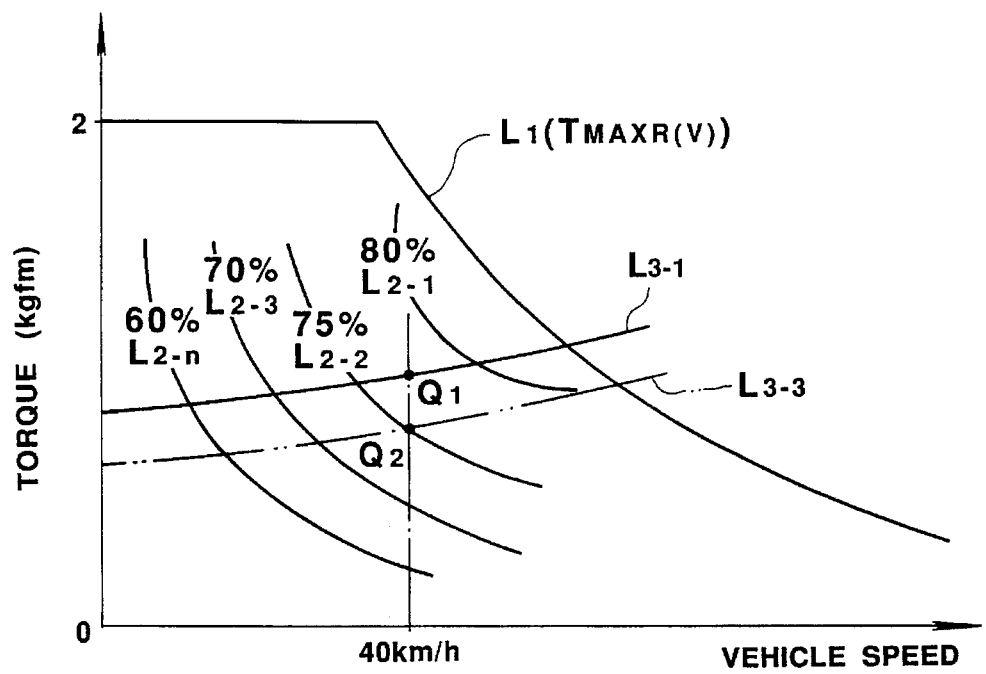
FIG. 3 is a graph illustrating characteristic curves of a low-power motor employed to drive rear wheels.

FIG. 2 shows output torque characteristic curves of the front-wheel drive motor 4, while FIG. 3 shows output torque characteristic curves of the rear-wheel drive motor 5. Note that the torque characteristics of the motor 4 are different from those of the motors 5. In FIGS. 2 and 3, $L_1$ designates a maximum torque characteristic curve illustrating a relationship between a maximum torque generated by the motor and a vehicle speed V, $L_{2-1}, L_{2-2}, L_{2-3}, \ldots, L_{2-n}$ designate characteristic curves illustrating motor efficiencies, and $L_{3-1}$, $L_{3-2}$, and $L_{3-3}$ designate motor load characteristic curves illustrating a relationship between the vehicle speed V, a travel resistance applied to the vehicle, and a minimum torque necessary to maintain the vehicle speed at a constant speed during a constant speed driving. As appreciated from FIGS. 2 and 3, the motor efficiency is increased in accordance with an increase in the vehicle speed V being in proportion to the rotational speed of the motor. The required minimum torque to be generated by the motor is varied depending on the magnitude of travel resistance. As is well known, the travel resistance of the vehicle is determined by the sum of a rolling resistance, an accelerating or decelerating resistance serving as an inertial resistance, a hill-climbing resistance, and an air resistance. For this reason, the entire travel resistance is gradually increased in accordance with an increase in the vehicle speed V, as seen in FIGS. 2 and 3. The entire travel resistance acts as a motor load. The motor load is defined as a minimum torque necessary to keep the vehicle speed at a constant speed during coasting. As seen in FIG. 2, the uppermost motor load characteristic curve $L_{3-3}$ represents a constant speed travelling state with a relatively high travel resistance, while the lowermost motor load characteristic curve $L_{3-1}$ represents a constant speed travelling state with a relatively low travel resistance.

As appreciated from FIGS. 2 and 3, the front-wheel drive motor 4 is a high-power motor which generates a maximum torque $T_{MAXF(V)}$, for example approximately 8 kgfm (V=0), while the rear-wheel drive motor 5 is a low-power motor which generates a maximum torque $T_{MAXR(V)}$, such as approximately 2 kgfm (V=0). In the first embodiment, the output torque relationship between the motors 4 and 5 is set such that the maximum torque $T_{MAXF(V)}$ of the motor 4 is greater than the maximum torque $T_{MAXR(V)}$ of the motor 5. The maximum torques $T_{MAXF(V)}$ and $T_{MAXR(V)}$ are hereinafter abbreviated to '$T_{MAXF}$' and '$T_{MAXR}$'.

Returning to FIG. 1, the wheel motor drive system according to the invention comprises a sensing device 10 for monitoring a travelling condition of the vehicle and a controller 20 for controlling the above noted power conversion circuits 8 and 9. The sensing device 10 and the controller 20 are operated by electric power converted from a high-voltage to a stable low-voltage by means of a step-down transformer (not shown). The sensing device 10 is comprised of an accelerator sensor 11 for monitoring a depressing amount of an accelerator pedal to generate an accelerator pedal depressing amount indicative signal A, a brake sensor 12 for monitoring a depressing amount of a brake pedal to generate a brake pedal depressing amount indicative signal B, and a vehicle speed sensor 13 for monitoring a vehicle speed to generate a vehicle speed indicative signal V.

The controller 20 is traditionally comprised of a microcomputer. The controller 20 comprises a memory 21 for storing a torque characteristic data D representative of a relationship between the vehicle speed V and the maximum torques $T_{MAXF}$ and $T_{MAXR}$, an arithmetic circuit 22 for deriving a required torque T to be generated by at least one of the motors 4 and 5 so as to keep the vehicle speed V detected by the vehicle speed sensor 13 at a designated constant speed based on the accelerator pedal depressing amount indicative signal A, a decision circuit 23 for determining whether the required torque T is equal to or greater than the maximum torque $T_{MAXF}$ produced by the front-wheel drive motor 4 and whether the required torque T is equal to or greater than the maximum torque $T_{MAXR}$ produced by the rear-wheel drive motor 5, and an output interface 24 connected to both power conversion circuits 8 and 9, for selectively connecting one of the motors 4 and 5 to the battery 1 or for simultaneously connecting both motors 4 and 5 to the battery 1, based on the decision instruction generated by the decision circuit 23. When the motor is connected through the power conversion circuit to the battery, the motor is driven with a controlled electric power necessary to provide the required torque determined by the arithmetic circuit 22, as hereinbelow described in detail. In the arithmetic circuit 22, the required torque T is determined on the basis of the depressing amount A of the accelerator and the maximum torques $T_{MAXF}$ and $T_{MAXR}$, in accordance with the following equation.

$$T = A(T_{MAXF} + T_{MAXR})$$

Figure 4:
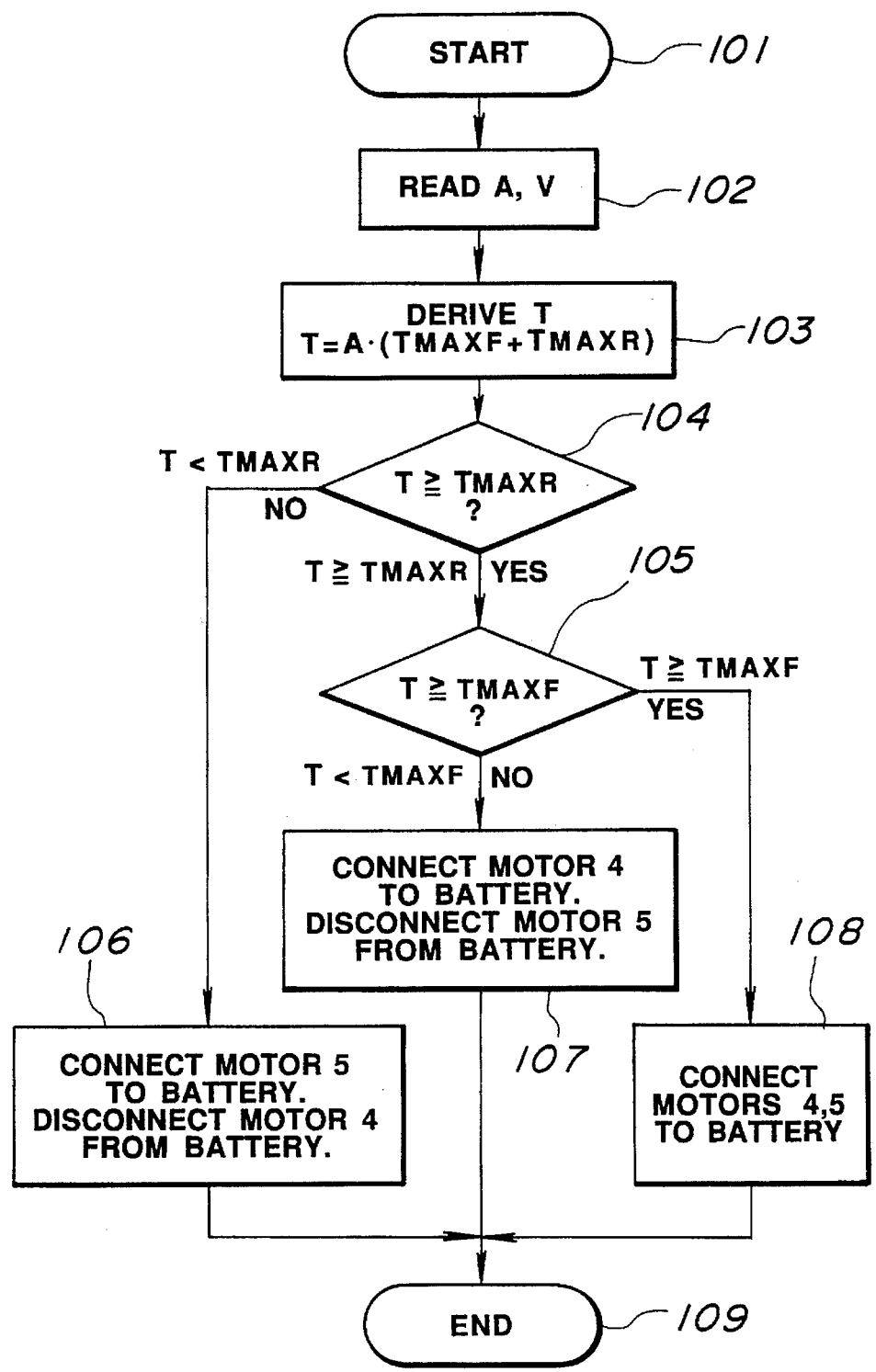
FIG. 4 is a flow chart illustrating a control procedure executed by a controller employed in the wheel motor drive system of the first embodiment.

The controller 20 is switched to an ON or OFF state by means of a main switch (not shown). The operation of the wheel motor drive system of the first embodiment is hereinbelow described in detail in accordance with the flow chart of FIG. 4.

When the main switch is turned ON, and subsequently the accelerator pedal is depressed by the operator and thus the electric automobile travels, the controller 20 is operated as follows.

In step 101, the main switch is turned ON and the accelerator-pedal depressing amount data A and the vehicle speed data V stored in memories employed in the controller 20 are both initialized. Thereafter, step 102 proceeds.

In step 102, the controller 20 receives the newly detected accelerator-pedal depressing amount data A and the vehicle speed data V and thereafter these data A and V are stored in the memories of the controller 20.

Subsequently, step 103 enters in which the controller 20 derives the maximum torques $T_{MAXF}$ and $T_{MAXR}$ on the basis of the renewal vehicle speed data V and the torque characteristic data D stored in the memory 21. In addition to the derivation of the torques $T_{MAXF}$ and $T_{MAXR}$, the required torque T is calculated by means of the arithmetic circuit 22, on the basis of the three data A, $T_{MAXF}$ and $T_{MAXR}$, in accordance with the previously mentioned equation $T=A(T_{MAXF}+T_{MAXR})$.

In step 104, a test is made to determine whether the required torque T is equal to or greater than the maximum torque $T_{MAXR}$ to be produced by the rear-wheel drive motor 5. Actually, such a test is made through the above decision circuit 23. If the answer to step 104 is in the affirmative (yes), i.e., $T \geq T_{MAXR}$, step 105 proceeds in which another test is made to determine whether the required torque T is equal to or greater than the maximum torque $T_{MAXF}$ to be produced by the front-wheel drive motor 4. Conversely, if the answer to step 104 is in the negative (no), i.e., $T<T_{MAXR}$, step 106 proceeds in which the output interface 24 of the controller 20 outputs both a first torque command $T_1$ corresponding to a value of torque 0 to the power conversion circuit 8 and a second torque command $T_2$ corresponding to a value of the required torque T to the power conversion circuit 9, with the result that the power conversion circuit 9 operates to connect the low-power motor 5 to the battery so as to supply a controlled electric power to the motor 5 therethrough and the power conversion circuit 8 operates to disconnect the high-power motor 4 from the battery.

If the answer to step 105 is in the affirmative, i.e., $T \geq T_{MAXF}$, step 108 proceeds in which the interface 24 outputs the first command $T_1$ corresponding to a value of torque $A(T_{MAXF})$ to the power conversion circuit 8 and the second torque command $T_2$ corresponding to a value of torque $\{T - A(T_{MAXF})\}$, i.e., $A(T_{MAXR})$ to the power conversion circuit 9, with the result that the power conversion circuit 8 operates to connect the high-power motor 4 to the battery so as to supply a controlled electric power essentially corresponding to the maximum output torque $A(T_{MAXF})$ to be generated by the motor 4 and the power conversion circuit 9 operates to connect the low-power motor 5 to the battery so as to supply a controlled electric power essentially corresponding to the under-torque $A(T_{MAXR})$ obtained by subtracting the maximum output torque $A(T_{MAXF})$ generated by the motor 4 from the required torque T. Conversely, if the answer to step 105 is in the negative, i.e., $T_{MAXR} \geq T<T_{MAXF}$, step 107 proceeds in which the interface 24 outputs the first torque command $T_1$ corresponding to a value of the required torque T to the power conversion circuit 8 and the second torque command $T_2$ corresponding to a value of torque 0 to the power conversion circuit 9, with the result that the power conversion circuit 8 operates to connect the high-power motor 4 to the battery so as to supply a controlled electric power to the motor 4 therethrough and the power conversion circuit 9 operates to disconnect the low-power motor 5 from the battery.

In step 109, one cycle of procedure ends. After this, the procedure returns from step 109 to step 101. Thus, the previously described drive motor control procedure is repeated at a designated cycle until the main switch is turned OFF.

Referring to step 106, only the low-power motor 5 is driven by the power conversion circuit 9 with a required electric power, on the basis of the decision instruction representing that the required torque T is less than the maximum torque $T_{MAXR}$. This means that the driving torque produced by only the motor 5 satisfies the required torque enough to keep the vehicle speed V read at step 102 at a designated constant speed based on the accelerator pedal depressing amount indicative signal A, as appreciated from a relatively low motor-load characteristic curve $L_{3-1}$ indicated by the solid line of FIGS. 2 and 3. For example, supposing that a small driving torque T, such as approximately 1 kgfm is required to keep the vehicle speed constant during constant-speed travelling at a vehicle speed of 40 km/h with a relatively small travel resistance, the motor efficiency is approximately 60% as indicated by the point $P_1$ plotted on the motor load characteristic curve $L_{3-1}$ of FIG. 2, if the small required torque of 1 kgfm is provided by the high-power motor 4. On the other hand, when only the low-power motor 5 is driven to provide a small torque of 1 kgfm, the motor efficiency is approximately 77.5% as indicated by the point $Q_1$ plotted on the motor load characteristic curve $L_{3-1}$ of FIG. 3. As appreciated from the above, the motor efficiency is enhanced by selecting the low-power motor 5 when a relatively small driving torque is required.

Referring to step 107, only the high-power motor 4 is driven by the power conversion circuit 8 with a required electric power, on the basis of the decision instruction representing that the required torque T is equal to or greater than the maximum torque $T_{MAXR}$ and less than the maximum torque $T_{MAXF}$. This means that the driving torque produced by only the motor 4 satisfies the required torque enough to keep the vehicle speed V read at step 102 at a designated constant speed based on the accelerator pedal depressing amount indicative signal A, as appreciated from a middle motor-load characteristic curve $L_{3-2}$ indicated by the one-dotted line of FIG. 2. Supposing that a middle driving torque T, such as approximately 3.5 kgfm is required to keep the vehicle speed constant during constant-speed travelling at a vehicle speed of 40 km/h with a middle travel resistance, the motor efficiency is approximately 75% as indicated by the point $P_2$ plotted on the motor load characteristic curve $L_{3-2}$ of FIG. 2, when the middle required torque of 3.5 kgfm is provided by the high-power motor 4. On the other hand, if only the low-power motor 5 is driven to provide the middle torque of 3.5 kgfm, the motor failure may occur due to overloading. As set forth above, the motor efficiency is enhanced by selecting the high-power motor 4 when a middle driving torque is required.

Referring to step 108, the high-power motor 4 and the low-power motor 5 are respectively driven by the power conversion circuits 8 and 9, on the basis of the decision instruction representing that the required torque T exceeds the maximum torque $T_{MAXF}$. This means that the maximum driving torque produced by only the high-power motor 4 does not satisfy the required torque enough to keep the vehicle speed V read at step 102, as appreciated from a relatively high motor-load characteristic curve $L_{3-3}$ indicated by the two-dotted line of FIG. 2, and the under-torque $\Delta T$ must be complemented by the low-power motor 5. For example, supposing that a relatively high driving torque T, such as approximately 9 kgfm is required to keep the vehicle speed constant during constant-speed travelling at a vehicle speed of 40 km/h with an extremely great travel resistance, the required torque T is not satisfied by only the maximum torque $T_{MAXF}$ produced by the motor 4 as seen in the uppermost motor load characteristic curve $L_{3-3}$ of FIG. 2. Therefore, in addition to the motor 4, the other motor 5 is also driven by the power conversion circuit 9 with a controlled electric power so as to complement the under-torque. As shown in FIG. 3, when the required torque T exceeds the maximum torque $T_{MAXF}$ during constant-speed travelling within a standard vehicle speed range of 40 km/h to 60 km/h, it is preferable that the low-power motor 5 is designed such that the under-torque $\Delta T$ can be supplied within a torque range providing a relatively high motor efficiency of 75% or more, as indicated by the point $Q_2$ plotted on the motor load characteristic curve $L_{3-3}$ of FIG. 3. The under-torque $\Delta T$ is easily derived in accordance with the following equation.

$$\Delta T = T - A(T_{MAXF}) = A(T_{MAXR})$$

where, A designates the accelerator-pedal depressing amount.

In this manner, since at least one of the motors is driven within a high motor efficiency range by the controller of the first embodiment, the electric automobile can economically travel at a designated constant speed based on the signal A from the accelerator sensor, in a low power consumption mode.

Alternatively, when the electric vehicle is braked by a regenerative braking action of at least two different electric motors, a sufficient braking effect can be provided by an optimal arrangement of the motors having different torque characteristics independently of each other, since an efficiency of generating of the coasting motor is substantially similar to the power-running motor efficiency characteristics as shown in FIGS. 2 and 3. As is generally known, during braking, more of the car weight is transferred to the front wheels and thus the car weight becomes less at the rear wheels. Under such a longitudinal load shifting condition during braking, if normal braking were continued, the brakes could first lock the rear wheels so that the rear tires skid. In the first embodiment, since the high-power motor 4 is arranged at the front-wheel side and the low-power motor 5 is arranged at the rear-wheel side, the braking force generated by the front-wheel drive motor 4 exceeds that of the rear-wheel drive motor 5. Such a braking force distribution between front and rear wheels effectively prevents a rear-end skid of the vehicle. As a result, the efficiency of generating of the coasting motors may also be enhanced due to the previously noted effective regenerative braking action without wheel-lock. Consequently, the wheel motor drive system according to the first embodiment may provide a permissible long travel distance per one battery discharge cycle, since the regenerative braking action can be timely provided within an output torque range providing a relatively high motor efficiency, such as 75% or more.

Conversely, assuming that an electric automobile is designed such that an accelerating performance gets priority over a braking performance, it is preferable that a low-power motor is utilized as a front-wheel drive motor and a high-power motor is utilized as a rear-wheel drive motor.

Second embodiment

Figure 5:
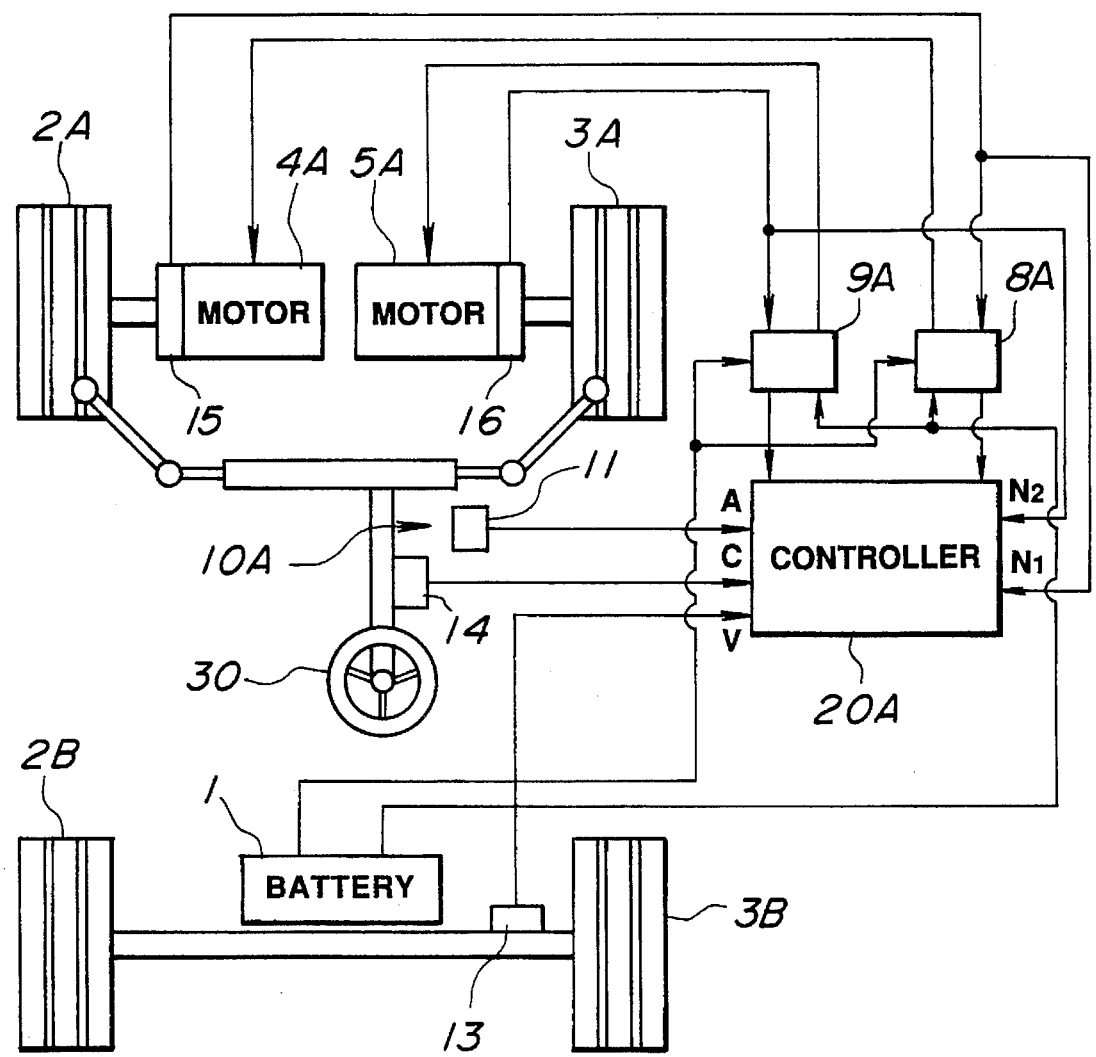
FIG. 5 is an illustration of the overall construction of a second embodiment according to the invention.
Figure 6:
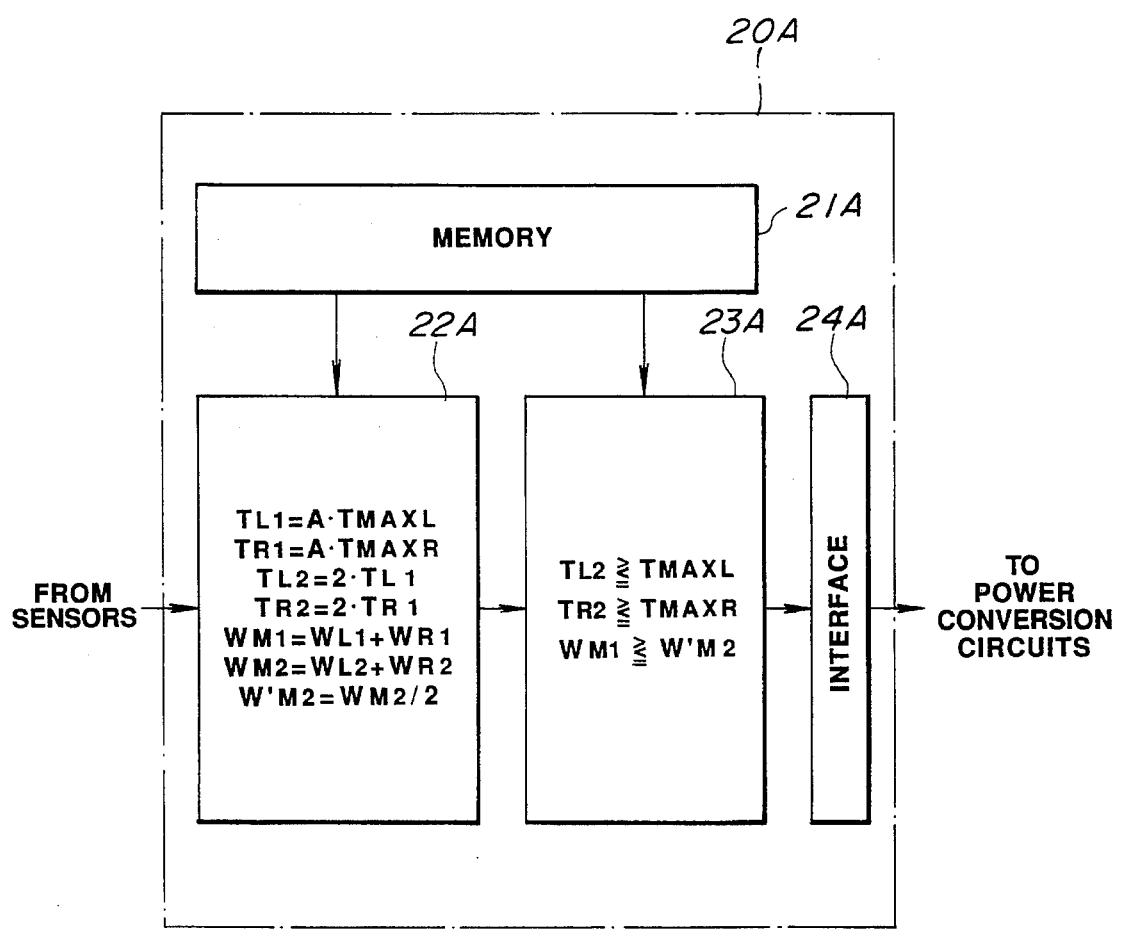
FIG. 6 is a block diagram illustrating a controller employed in the wheel motor drive system of the second embodiment.
Figure 7:
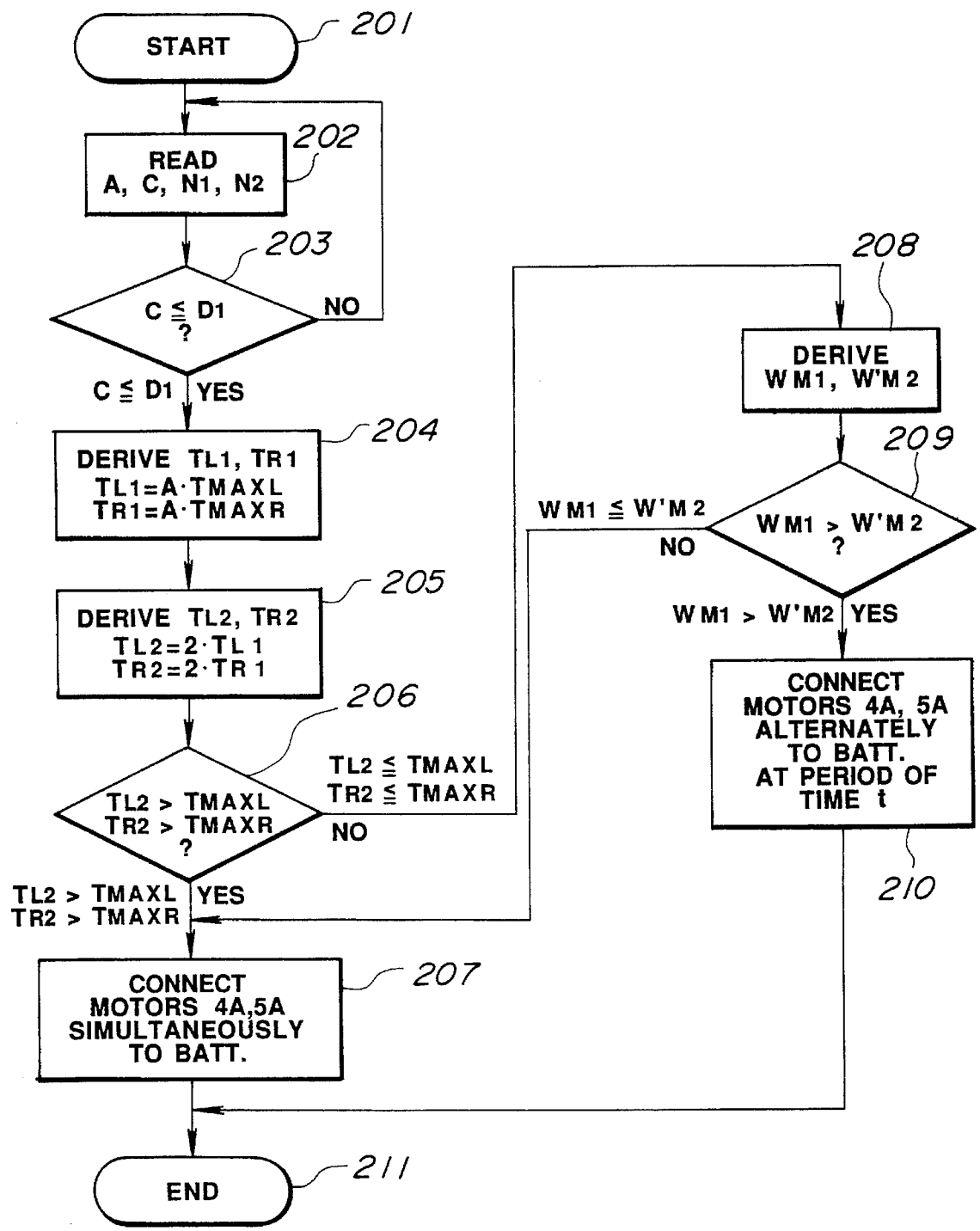
FIG. 7 is a flow chart illustrating a control procedure executed by a controller employed in the wheel motor drive system of the second embodiment.

FIGS. 5 to 7, show the second embodiment of a wheel motor drive system for electric automobiles. For the purpose of simplification of description, the same reference numerals used in the first embodiment of FIG. 1 will be applied to the corresponding elements used in the second embodiment. The second embodiment is different from the first embodiment in that two electric motors are respectively connected to steered wheels so as to provide a steering action, such that the left-wheel drive motor 4A is connected to a left driven wheel 2A and the right-wheel drive motor 5A is connected to a right driven wheel 3A.

Referring now to FIG. 5, the wheel motor drive system of the second embodiment includes a sensing device 10A for monitoring a travelling condition of the vehicle and a controller 20A for controlling the above noted motors 4A and 5A. The sensing device 10A is comprised of an accelerator sensor 11 for monitoring the accelerator pedal depressing amount A, a vehicle speed sensor 13 for monitoring the vehicle speed V, a steering angle sensor 14 for monitoring a steering angle of a steering system 30 to generate a steering angle indicative signal C, a left-wheel drive motor speed sensor 15 for monitoring a rotational speed of the left-wheel drive motor 4A to generate a left-wheel drive motor speed indicative signal $N_1$, and a right-wheel drive motor speed sensor 16 for monitoring a rotational speed of the right-wheel drive motor 5A to generate a right-wheel drive motor speed indicative signal $N_2$. The controller 20A receives the signals A, V, C, $N_1$, and $N_2$ produced by the above sensors so as to derive a required rotational speed difference $\Delta N$ which permits the electric vehicle to safely turn, while allowing the left and right wheels to turn different amounts when the vehicle rounds a curve. The required rotational speed difference $\Delta N$ is derived on the basis of the signals C, $N_1$ and $N_2$ in accordance with the following equation.

$$\Delta N = C(N_1 - N_2)$$

The controller 20A outputs two different turning amount indicative signals to a pair of power conversion circuits 8A and 9A, in response to the required rotational speed difference $\Delta N$. Thereafter, the power conversion circuits 8A and 9A drive the motors 4A and 5A on the basis of these turning amount indicative signals, in such a manner as to allow the left-wheel drive motor 2A and the right-wheel drive motor 3A to rotate with a desirable rotational speed difference, while producing a required left-wheel driving torque $T_{L1}$ and a required right-wheel driving torque $T_{R1}$. In other words, a pair of motors 4A and 5A, which are respectively connected to left and right steered wheels, functions as a differential gear. In FIG. 5, reference numerals 2B and 3B respectively denotes left and right non-driven wheels.

The aforementioned construction of the second embodiment is similar to that of the previously described Japanese Patent First Publication Tokkai (Showa) 62-138002. Note that the wheel motor drive system of the second embodiment also includes another type of controller 20A different from the controller 20 employed in the first embodiment.

As shown in FIG. 6, the controller 20A is comprised of a memory 21A, an arithmetic circuit 22A, a decision circuit 23A, and an output interface 24A. The memory 21A stores a criterion data $D_1$ necessary to determine whether or not the vehicle is in an essentially straight driving state, torque characteristic data $D_2$ representative of a relationship between the rotational speed $N_1$ and the maximum torque $T_{MAXL}$ of the left-wheel drive motor 4A and representative of a relationship between the rotational speed $N_2$ and the maximum torque $T_{MAXR}$ of the right-wheel drive motor 5A, and electric power consumption characteristic data $D_3$ representative of a relationship between the rotational speed $N_1$, the required torque $T_{L1}$, and an electric power consumption $W_{L1}$ of the left-wheel drive motor 4A, and representative of a relationship between the rotational speed $N_2$, the required torque $T_{R1}$, and an electric power consumption $W_{R1}$ of the eight-wheel drive motor 5A. The controller 20A determines the travelling state of the vehicle on the basis of the above mentioned criterion $D_1$, such that the vehicle is in a straight driving state when the monitored steering angle C is within the criterion $D_1$ and a left or right turn is made when the steering angle C is out of the criterion $D_1$. In the second embodiment, $T_{MAXR}$ represents a maximum torque produced by the right-wheel drive motor 5A.

The arithmetic circuit 22A derives the required torque $T_{L1}$ to be generated by the motor 4A and the required torque $T_{R1}$ to be generated by the motor 5A so as to keep the monitored rotational speed $N_1$ at a first designated constant speed based on the depressing amount indicative signal A and to keep the monitored rotational speed $N_2$ at a second designated constant speed based on the depressing amount indicative signal A, thereby insuring a smooth left or right turn of the electric vehicle. The required torques $T_{L1}$ and $T_{R1}$ are calculated in accordance with the following equations.

$$T_{L1}=A(T_{MAXL})$$

$$T_{R1}=A(T_{MAXR})$$

where, A represents the accelerator pedal depressing amount. In addition to the above, the arithmetic circuit. 22A derives a multiple torque $T_{L2}$ obtained by multiplying the required torque $T_{L1}$ by the number n of the wheel drive motors, and a multiple torque $T_{R2}$ obtained by multiplying the required torque $T_{R1}$ by the same. Since in the second embodiment, the number of the motors is 2, the multiple torques $T_{L2}$ and $T_{R2}$ are determined in accordance with the following equations.

$$T_{L2}=n(T_{L1})=2(T_{L1})$$

$$T_{R2}=n(T_{R1})=2(T_{R1})$$

The arithmetic circuit 22A derives the electric power consumption characteristic data $D_3$ from the memory 21A and determines the sum $W_{M1}$ of electric power consumptions at the required torques $T_{L1}$ and $T_{R1}$ respectively generated by the motors 4A and 5A driven simultaneously with each other, in accordance with the following equation.

$$W_{M1}=W_{L1}+W_{R1}$$

where, $W_{L1}$ represents an electric power consumption of the left-wheel drive motor 4A generating the required torque $T_{L1}$, while $W_{R1}$ represents an electric power consumption of the right-wheel drive motor 5A generating the required torque $T_{R1}$.

On the basis of the electric power consumption characteristic data $D_3$, the arithmetic circuit 22A determines the sum $W_{M2}$ of electric power consumptions at the multiple torques $T_{L2}$ and $T_{R2}$. The sum $W_{M2}$ is calculated in accordance with the following equation.

$$W_{M2}=W_{L2}+W_{R2}$$

where, $W_{L2}$ represents an electric power consumption of the left-wheel drive motor 4A generating the multiple torque $T_{L2}$, while $W_{R2}$ represents an electric power consumption of the right-wheel drive motor 5A generating the multiple torque $T_{R2}$.

The arithmetic circuit 22A also determines a mean electric power consumption $W'_{M2}$ consumed by the alternately driven motors 4A and 5A at the designated cycle t, such as 7 sec. The mean power consumption $W'_{M2}$ is easily calculated in accordance with the following equation.

$$W'_{M2}=W_{M2}/2=(W_{L2}+W_{R2})/2$$

The decision circuit 23A receives the multiple torque data $T_{L2}$ and $T_{R2}$, and the motor speed data $N_1$ and $N_2$ through the arithmetic circuit 22A, and derives the maximum torque data $T_{MAXL}$ and $T_{MAXR}$ through the memory 21A. Thereafter, the decision circuit 23A determines whether the multiple torque $T_{L2}$ is equal to or greater than the maximum torque $T_{MAXL}$ and whether the multiple torque $T_{R2}$ is equal to or greater than the maximum torque $T_{MAXR}$. The decision circuit 23A determines whether the power consumption $W_{M1}$ is equal to or greater than the power consumption $W'_{M2}$. As appreciated from the above, the magnitude of power consumption $W_{M1}$ is equal to the electric power consumption consumed by simultaneously driven motors 4A and 5A to provide both required torques $T_{L1}$ and $T_{R1}$, while the magnitude of power consumption $W'_{M2}$ is equal to an electric power consumption consumed by alternately driven motors 4A and 5A at the designated cycle t so as to alternately provide one of the multiple torques $T_{L2}$ and $T_{R2}$.

The output interface 24A is connected to both power conversion circuits 8A and 9A for operating them based on the decision instruction generated by the decision circuit 23A. Actually, the interface 24A operates the power conversion circuits 8A and 9A in such a manner as to connect both motors 4A and 5A to the battery simultaneously with each other, when the multiple torque $T_{L2}$ of the left-wheel drive motor exceeds the maximum torque $T_{MAXL}$ and the multiple torque $T_{R2}$ of the right-wheel drive motor exceeds the maximum torque $T_{MAXR}$, or when the multiple torque $T_{L2}$ of the left-wheel drive motor is equal to or less than the maximum torque $T_{MAXL}$ and the multiple torque $T_{R2}$ of the right-wheel drive motor is equal to or less than the maximum torque $T_{MAXR}$ and the power consumption $W_{M1}$ is equal to or less than the power consumption $W'_{M2}$. Furthermore, the interface 24A operates these motor-drive circuits in such a manner as to connect the motors 4A and 5A alternately to the battery at the designated cycle, when the multiple torque $T_{L2}$ is equal to or less than the maximum torque $T_{MAXL}$ and the multiple torque $T_{R2}$ is equal to or less than the maximum torque $T_{MAXR}$ and in addition the power consumption $W_{M1}$ exceeds the power consumption $W'_{M2}$. The designated cycle t is experimentally determined to allow a substantially straight driving of the vehicle without yawing, on the basis of test results representing a responsibility with regard to a rate of yawing exerted on the vehicle body due to a double driving torque applied alternately to left or right wheels. The designated cycle t is actually set at a relatively small period of time, such as 7 sec or less, based on the test results assured by the inventors of the present invention.

The operation of the wheel motor drive system employing the controller 20A is hereinbelow described in detail in accordance with the flow chart of FIG. 7.

In step 201, the main switch is turned on and the accelerator pedal depressing amount data A, the steering angle data C, the left-wheel drive motor speed $N_1$ and the right-wheel drive motor speed $N_2$ stored in memories in the controller 20A are all initialized. Thereafter, step 202 enters.

In step 202, the controller 20A receives the newly detected accelerator-pedal depressing amount data A, the newly detected steering angle data C, the newly detected motor speed data $N_1$ and $N_2$, to store these data in the memories thereof.

After this, step 203 proceeds in which a test is made to determine whether or not the steering angle C is within the criterion $D_1$. When the answer to step 203 is in the negative, i.e., C>$D_1$, the controller determines that the vehicle is turning to the right or left. The procedure returns to step 202 to execute a normal turning control routine according to which a proper differential operation is achieved depending on a degree of turning of the vehicle. Conversely, when the answer to step 203 is in the affirmative, i.e., C≦$D_1$, the controller determines that the vehicle is in a straight-ahead driving state and the steering system is kept at a substantially straight-ahead position. Thereafter, step 204 proceeds in which the controller 20A derives the maximum torques $T_{MAXL}$ and $T_{MAXR}$ on the basis of the renewal vehicle speed data V from the torque characteristic data $D_2$ stored in the memory 21A. Furthermore, the required torques $T_{L1}$ and $T_{R1}$ are calculated by means of the arithmetic circuit 22A, on the basis of the three data A, $T_{MAXL}$, and $T_{MAXR}$, in accordance with the previously noted equations $T_{L1}=A(T_{MAXL})$ and $T_{R1}=A(T_{MAXR})$.

Subsequently, step 205 proceeds in which the multiple torques $T_{L2}$ and $T_{R2}$ are calculated by means of the arithmetic circuit 22A, based on the calculated torques $T_{L1}$ and $T_{R1}$, in accordance with the previously noted equations $T_{L2}=2(T_{L1})$ and $T_{R2}=2(T_{R1})$.

In step 206, a test is made to determine whether the multiple torque $T_{L2}$ exceeds the maximum torque $T_{MAXL}$ and whether the multiple torque $T_{R2}$ exceeds the maximum torque $T_{MAXR}$. When the answer to step 206 is in the affirmative, i.e., $T_{L2}$>$T_{MAXL}$ and $T_{R2}$>$T_{MAXR}$, step 207 proceeds in which the interface 24A outputs the first command $T_1$ corresponding to a value of the required torque $T_{L1}$ to the power conversion circuit 8A and the second command $T_2$ corresponding to a value of the required torque $T_{R1}$ to the power conversion circuit 9A, with the result that the power conversion circuit 8A operates to connect the motor 4A to the battery so as to supply a controlled electric power necessary to generate the required torque $T_{L1}$ and simultaneously to connect the motor 5A to the battery so as to supply a controlled electric power necessary to generate the required torque $T_{R1}$. This prevents the motors 4A and 5A to be damaged by overloading when the two motors are alternately driven to generate the multiple torques $T_{L2}$ or $T_{R2}$ at the designated cycle t, under the above noted particular condition of $T_{L2}$>$T_{MAXL}$ and $T_{R2}$>$T_{MAXR}$. Thereafter, step 211 proceeds in which one cycle of procedure terminates. After this, the procedure returns from step 211 to step 201. In this manner, the previously noted procedure is repeated at a designated period of time until the main switch is turned OFF.

Returning to step 206, if the answer is in the negative, i.e., $T_{L2}$≦$T_{MAXL}$ and $T_{R2}$≦$T_{MAXR}$, consequently each motor does not experience overloading. In this case, step 208 proceeds subsequently to step 206, in which the two electric power consumption data $W_{M1}$ and $W'_{M2}$ are derived by the decision circuit 23A. Thereafter, step 209 proceeds in which a test is made to determine whether the power consumption $W_{M1}$ to be obtained during operation of both motors 4A and 5A driven simultaneously with each other exceeds the power consumption $W'_{M2}$ to be obtained during operation of the motors 4A and 5A driven alternately to each other at the designated cycle t.

If the answer to step 209 is in the negative, i.e., $W_{M1}$≦$W'_{M2}$, step 207 proceeds in which both motors 4A and 5A are connected through the power conversion circuits 8A and 9A to the battery simultaneously with each other, in such a manner as to simultaneously generate both the required torque $T_{L1}$ from the motor 4A and the required torque $T_{R1}$ from the motor 5A. Conversely, if the answer to step 209 is in the affirmative, i.e., $W_{M1}$>$W'_{M2}$, step 210 proceeds in which the interface 24A operates the power conversion circuits 8A and 9A in such a manner as to connect the motors 4A and 5A to the battery alternately to each other so as to alternately generate the multiple torques $T_{L2}$ or $T_{R2}$ at the designated period of time t. Next, the procedure is shifted from step 210 to step 211 wherein one cycle of procedure ends. As set forth above, it is advantageous to compare the two power consumptions $W_{M1}$ and $W'_{M2}$, respectively obtained at the previously described two different motor driving modes, so as to assure a relatively long travel distance of the electric automobile.

As set forth above, since the wheel motor drive system according to the second embodiment can select an optimal energy-saving motor driving mode out of the two motor driving modes executed at steps 207 and 210, the electric automobile economically travels straight on ahead at a designated constant speed based on the signal A.

As will be appreciated from the above, the wheel motor drive system for electric automobiles according to the invention can provide an optimal energy-saving motor drive mode or an economical electric power-consumption motor drive mode depending on a travel resistance of the automobile, since the system selects the best drive mode of a plurality of motor drive modes so that the motor is driven within a high motor efficiency range.

In order to enhance an efficiency of electric motor employed in an electric automobile, although in the first embodiment a high-power motor is utilized as a front-wheel drive motor and a low-power motor is utilized as a rear-wheel drive motor, while in the second embodiment two motors which respectively generate a substantially same power are utilized as left- and right-wheel drive motors, the first embodiment may be easily combined with the second embodiment. That is, the high-power motor may be replaced with the same middle-power motors to drive the front-left and front-right wheels independently of each other.

Although in the first and second embodiments, the wheel drive motor system according to the invention is utilized for a four-wheeled electric car, the drive system may be utilized for a two-wheeled electric car or a three-wheeled electric car.

Third embodiment

FIGS. 8, 9, 10A, 10B, and 10C show the third embodiment of a wheel motor drive system for electric automobiles. For the purpose of simplification of description, the same reference numerals used in the first embodiment FIG. 1 will be applied to the corresponding elements used in the third embodiment. The third embodiment is different from the first embodiment in that two different motors 4 and 5 are replaced with two identical rated motors 4B and 5B and the two identical rated motors are controlled in consideration of load applied to each of the motors 4B and 5B.

Figure 8:
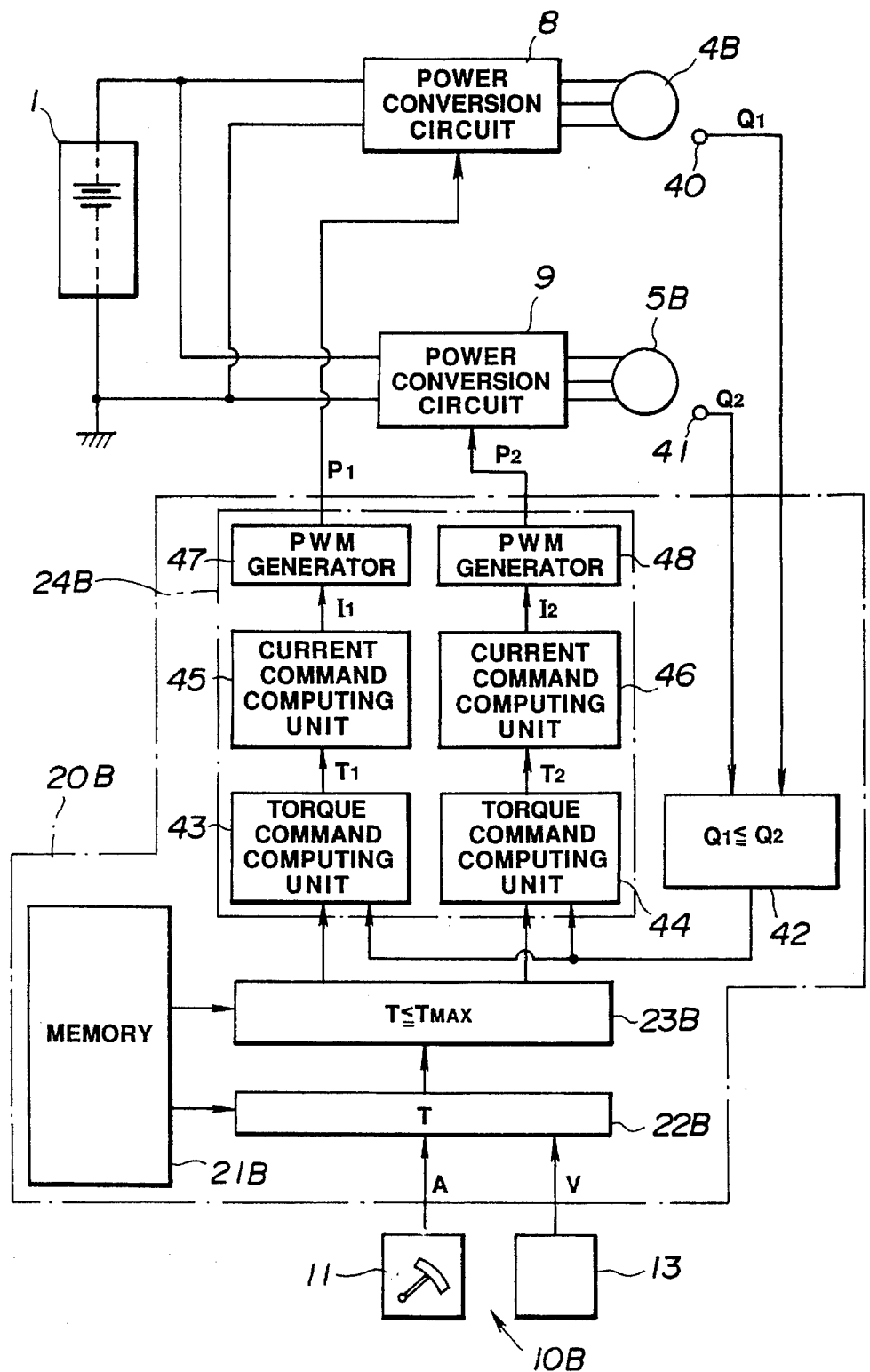
FIG. 8 is a block diagram illustrating a third embodiment of a wheel motor drive system for electric automobiles according to the invention.
Figure 9:
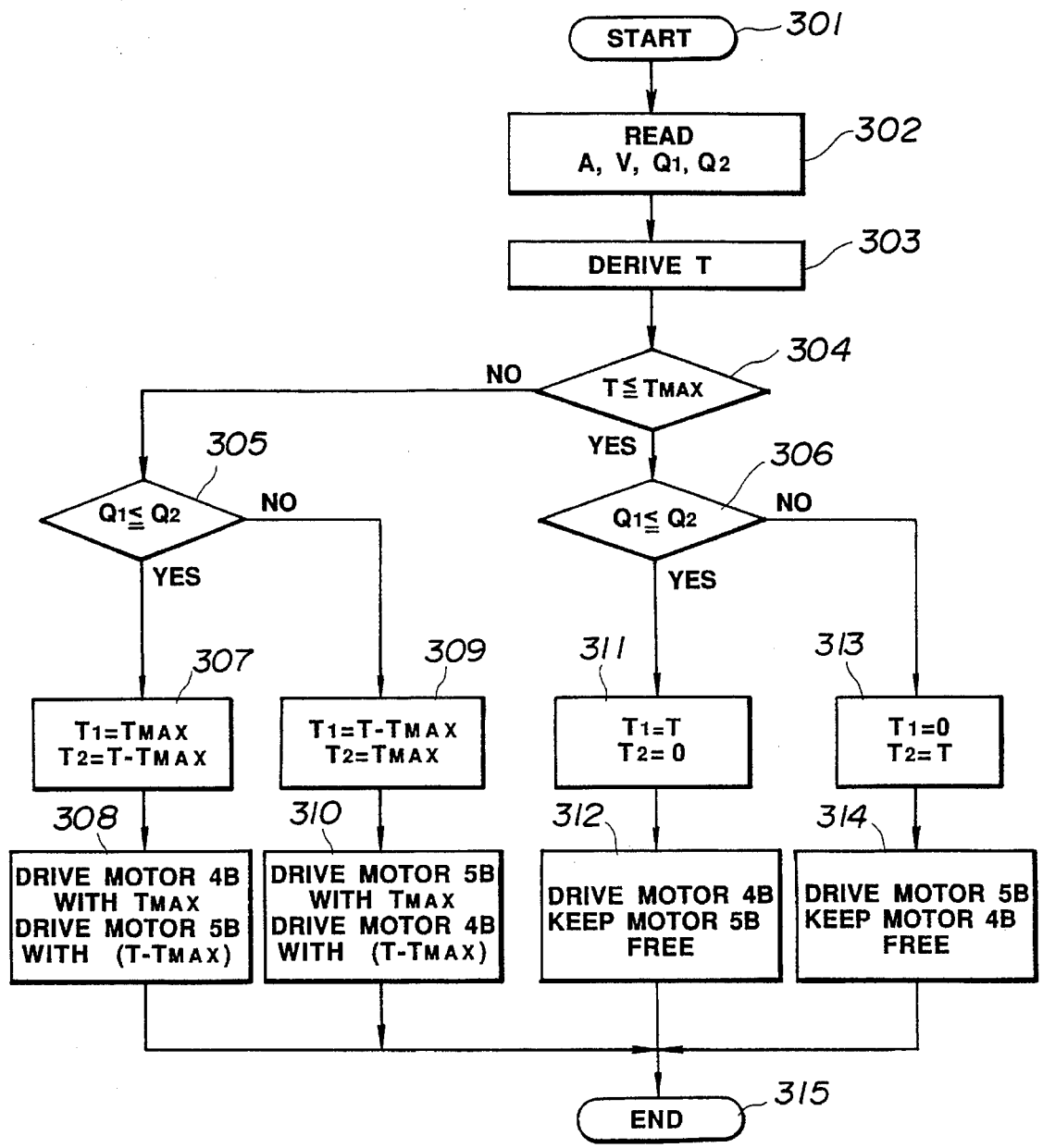
FIG. 9 is a flow chart illustrating a control procedure executed by a controller employed in the wheel motor drive system of the third embodiment.
Figure 10A:
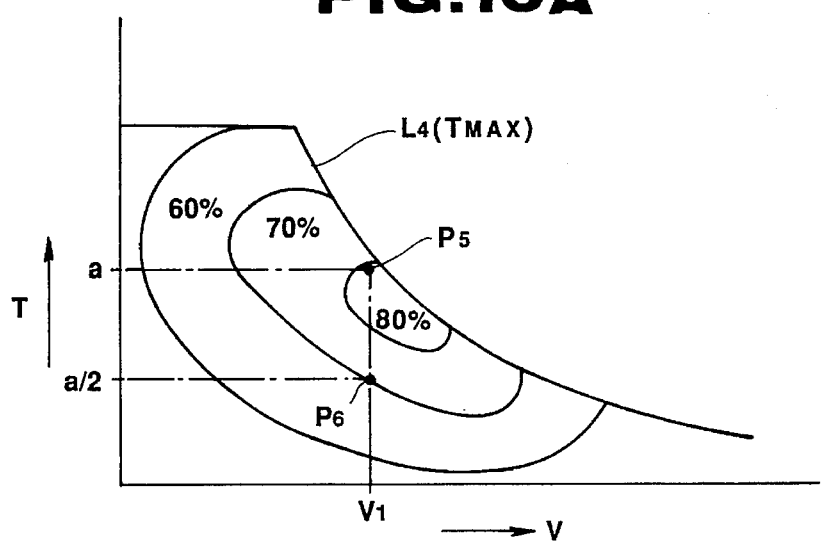
FIG. 10A is a graph illustrating characteristic curves of two same motors connected to driven wheels for driving these wheels independently of each other.

Referring now to FIG. 8, the wheel motor drive system of the third embodiment includes a sensing device 10B for monitoring a travelling condition of the vehicle and controller 20B for controlling the above noted motors 4B and 5B. The sensing device 10B includes an accelerator sensor 11 for monitoring the accelerator pedal depressing amount A, a vehicle speed sensor 13 for generating the vehicle speed indicative signal V, and the like. The wheel motor drive system of the third embodiment includes two motor load detecting devices 40 and 41. In the third embodiment, one motor load detecting device 40 is comprised of a first temperature sensor provided for monitoring a temperature of the rotor rotatably enclosed in the motor 4B to generate a first motor temperature indicative signal $Q_1$, while the other motor load detecting device 41 is comprised of a second temperature sensor provided for monitoring a temperature of the rotor rotatably enclosed in the motor 5B to generate a second motor temperature indicative signal $Q_2$. The controller 20B receives the signals A and V so as to derive a required torque T in the same manner as the first embodiment and receives the signals $Q_1$ and $Q_2$ so as to compare the load applied to the motor 4B with the load applied to the motor 5B. The output interface of the controller 20B is connected to the power conversion circuit 8 provided for driving the motor 4B and to the power conversion circuit 9 provided for driving the motor 5B. The respective motors 4B and 5B are an identical rated motor having output torque characteristic curves shown in FIG. 10A. In FIG. 10A, $L_4$ designates a maximum torque characteristic curve illustrating a relationship between a maximum torque $T_{MAX}$ generated by the motor 4B or 5B and a vehicle speed V. The controller 20B comprises a memory 21B for storing a torque characteristic data $D_4$ representative of a relationship between the vehicle speed V and the maximum torque $T_{MAX}$, an arithmetic circuit 22B receiving the signals from the sensing device 10B, for deriving the required torque T to be generated by at least one of the motors 4B and 5B so as to keep the vehicle speed V detected by the vehicle speed sensor 13 at a designated constant speed based on the accelerator pedal depressing amount indicative signal A, a decision circuit 23B for determining whether the required torque T is equal to or greater than the maximum torque $T_{MAX}$ produced by the motor 4B or 5B, and an output interface 24B connected to both power conversion circuits 8 and 9, for selectively connecting one of the motors 4B and 5B to the car battery 1 or for simultaneously connecting both motors 4B and 5B to the battery 1, based on the decision instruction generated by the decision circuit 23B. When at least one of the motors is connected through the associated power conversion circuit to the battery, the motor is driven with a controlled electric power necessary to provide the required torque determined by the arithmetic circuit 22B, as hereinbelow described in detail. In the arithmetic circuit 22B, the required torque T is determined on the basis of the depression amount A of the accelerator and the maximum torque $T_{MAX}$, in accordance with the following equation.

$$T=2A(T_{MAX})$$

The controller 20B also includes a comparator 42 for outputting a comparison result indicative signal to the output interface 24B by comparing a value of the first motor temperature indicative signal $Q_1$ with a value of the second motor temperature indicative signal $Q_2$. The output interface 24B is comprised of a pair of torque command computing units 43 and 44 each receiving the decision instruction from the decision circuit 23B and the comparison result indicative signal from the comparator 42, for deriving both a first torque command $T_1$ corresponding to a torque to be generated by the motor 4B and a second torque command $T_2$ corresponding to a torque to be generated by the motor 5B, a pair of current command computing units 45 and 46 respectively receiving the first and second torque commands $T_1$ and $T_2$, for generating a first current command $I_1$ corresponding to a current value to be applied to the motor 4B and a second current command $I_2$ corresponding to a current value to be applied to the motor 5B, and a pair of pulse width modulation (PWM) generators 47 and 48 respectively receiving the first and second current commands $I_1$ and $I_2$, for outputting a first PWM command $P_1$ to the power conversion circuit 8 and for outputting a second PWM command $P_2$ to the power conversion circuit 9. In the third embodiment, it is preferable that either one of the motors 4B and 5B serves as a front-wheel drive motor, while the other motor serves as rear-wheel drive motor. The operation of the wheel motor drive system of the third embodiment is hereinbelow described in detail in accordance with the flow chart of FIG. 9.

When the main switch is turned ON and the accelerator pedal is subsequently depressed by the driver and thus the electric automobile travels, the controller 20B is operated as follows.

In step 301, the main switch is turned ON and the accelerator-pedal depressing amount data A, the vehicle speed data V, and the first and second motor temperature indicative signal values $Q_1$ and $Q_2$ stored in memories employed in the controller 20B are all initialized. Next, step 302 proceeds in which the controller 20B reads out the newly detected accelerator-pedal depressing amount data A, the vehicle speed data V and the first and second motor temperature data $Q_1$ and $Q_2$ and thereafter these data A, V, $Q_1$ and $Q_2$ are stored in the memories of the controller 20B.

Subsequently, step 303 enters in which the controller 20B derives the maximum torque $T_{MAX}$ on the basis of the renewal vehicle speed data V and the torque characteristic data $D_4$ stored in the memory 21B. In step 303, the required torque T is also calculated by means of the arithmetic circuit 22B, on the basis of the two data A, $T_{MAX}$, in accordance with the previously described equation $T=2A(T_{MAX})$.

In step 304, a test is made to determine whether the required torque T is equal to or less than the maximum torque $T_{MAX}$ to be generated by the motor 4B or 5B. Such a test is made through the above noted decision circuit 23B. If the answer to step 304 is in the negative, i.e., $T<T_{MAX}$, step 305 proceeds in which another test is made to determine whether the first motor temperature data $Q_1$ is equal to or less than the second motor temperature data $Q_2$. If the answer to step 305 is in the affirmative, i.e., $Q_1 \leq Q_2$, step 307 proceeds in which the interface 24B outputs the first command $T_1$ corresponding to a value of the maximum torque $T_{MAX}$ to the power conversion circuit 8 and the second torque command $T_2$ corresponding to a value of the under-torque $(T-T_{MAX})$ to the power conversion circuit 9, with the result that at step 308 the relatively low-loaded motor 4B is mainly driven to generate the maximum output torque $T_{MAX}$, while the relatively high-loaded motor 5B is subsidiarily driven to generate the under-torque $(T-T_{MAX})$.

In contrast to the above, if the answer to step 305 is in the negative, i.e., $Q_1>Q_2$, step 309 proceeds in which the interface 24B outputs the second command $T_2$ corresponding to a value of the maximum torque $T_{MAX}$ to the power conversion circuit 9 and the first torque command $T_1$ corresponding to a value of the under-torque $(T-T_{MAX})$, to the power conversion circuit 8, with the result that at step 310 the relatively low-loaded motor 5B is mainly driven to generate the maximum output torque $T_{MAX}$, while the relatively high-loaded motor 4B is subsidiarily driven to generate the under-torque $(T-T_{MAX})$.

Returning to step 304, if the answer to step 304 is in the affirmative, i.e., $T \leq T_{MAX}$, step 306 proceeds in which the first motor temperature data $Q_1$ is compared with the second motor temperature data $Q_2$ in the same manner as step 305. The answer to step 306 is affirmative, i.e., $Q_1 \leq Q_2$, step 311 proceeds in which the interface 24B outputs the first command $T_1$ corresponding to a value of the required torque $T$ to the power conversion circuit 8 and the second torque command $T_2$ corresponding to a value of torque 0 to the power conversion circuit 9, with the result that at step 312 the power conversion circuit 8 operates to connect the motor 4B to the battery so as to supply a controlled electric power to the motor 4B and to provide the required torque by only the motor 4B, and the power conversion circuit 9 operates to disconnect the motor 5B from the battery so as to prevent the power supply to the motor 5B and to permit free rotation of the motor 5B. Conversely, if the answer to step 306 is in the negative, i.e., $Q_1 > Q_2$, step 313 proceeds in which the interface 24B outputs the second torque command $T_2$ corresponding to a value of the required torque $T$ to the power conversion circuit 9 and the first torque command $T_1$ corresponding to a value of torque 0 to the power conversion circuit 8, with the result that at step 313 the power conversion circuit 9 operates to connect the motor 5B to the battery so as to supply a controlled electric power to the motor 5B and to provide the required torque by only the motor 5B and the power conversion circuit 8 operates to disconnect the motor 4B from the battery so as to prevent the power supply to the motor 4B and to permit free rotation of the motor 4B.

In step 315, one cycle of the control procedure terminates. After this, the procedure returns from step 315 to step 301. Thus, the previously described drive motor control procedure is repeated at a designated cycle until the main switch is turned OFF.

Referring to steps 308 and 310, the two identical rated motors 4B and 5B are respectively driven by the power conversion circuits 8 and 9, on the basis of the decision instruction representing that the required torque $T$ exceeds the maximum torque $T_{MAX}$. In this case, one of the motors which is in a lower load state than the other is driven with the maximum output torque $T_{MAX}$, while the other motor is driven subsidiarily to provide the under-torque $(T-T_{MAX})$. This means that the maximum driving torque produced by only one motor does not satisfy the required torque enough to keep the vehicle speed $V$ read at step 302 at a designated constant speed based on the accelerator pedal depressing amount indicative signal A. As appreciated from the above, the controller 20B employed in the wheel motor drive system of the third embodiment drivingly controls the two motors 4B and 5B in consideration of the respective load state of the two motors by comparing the one motor temperature $Q_1$ with the other motor temperature $Q_2$ in addition to the output torque characteristics of the motors, such that one of the motors loaded lower than the other is driven mainly with the maximum output torque, while the other motor is driven subsidiarily with the under-torque. As is generally known, the higher the motor temperature becomes, the greater the resistance of a winding of the motor becomes increased. In other words, copper loss or power loss in the winding of the motor is increased in accordance with an increase in the motor temperature. To enhance the motor efficiency, the controller controls the motors in such a manner as to mainly drive one of the motors being kept in a lower load state than the other with the maximum output torque $T_{MAX}$, and to subsidiarily drive the other motor with the under-torque $(T-T_{MAX})$. In the same rated motors 4B and 5B utilized in the third embodiment, the relationship between the motor temperature and the resistance of the copper conductors of the motor are experimentally assured by the inventors of the present invention, as indicated by the follow table.

| MOTOR TEMP. | 0° C. | 100° C. | 300° C. |
|---|---|---|---|
| VALUE OF RESISTANCE | 1.55 ohm/m | 2.23 ohm/m | 3.6 ohm/m |

On the basis of the above table, the power loss or copper loss $W_{LOSS}$ per 1 ampere is derived as follows.

| MOTOR TEMP. | 0° C. | 100° C. | 300° C. |
|---|---|---|---|
| POWER LOSS | 1.55 watt | 2.33 watt | 3.6 watt |

As appreciated from the above table, the power $W_{LOSS}$ in the motor winding due to current flow through the temperature dependent resistance of the copper conductors is increased according to an increase in the motor temperature. For example, the power loss obtained at the motor temperature 100° C. becomes approximately 1.4 times greater than that at the motor temperature 0° C. Furthermore, the power loss obtained at the motor temperature 300° C. becomes approximately 2.3 times greater than that at the motor temperature 0° C. As set forth above, it is advantageous to drivingly control the same rated motors employed in the wheel motor drive system of the third embodiment, in consideration of the motor load state of the employed motors, so as to keep the power loss of each motor at minimum and to enhance the motor efficiency.

Referring to step 312, only the motor 4B is driven by the power conversion circuit 8 with a required electric power, on the basis of the decision instruction representing that the required torque is $T$ is equal to or less than the maximum torque $T_{MAX}$. In this case, the controller 20B selects one of the motors being kept in a lower load state relative to the other so as to provide the required torque $T$ by only one of the motors 4B and 5B and to permit free rotation of the other motor. This means that the driving torque produced by the relatively low-loaded motor 4B satisfies the required torque enough to keep the vehicle speed $V$ read at step 302 at a designated constant speed based on the accelerator pedal depressing amount indicative signal A. In this manner, when $T \leq T_{MAX}$, the controller 20B of the third embodiment controls the two motors 4B and 5B in consideration of a motor load difference between the two motors, such that one of the motors loaded lower than the other is driven to provide the required output torque, while the other motor is kept free.

Referring to step 314, only the motor 5B is driven by the power conversion circuit 9 with a required electric power, on the basis of the decision instruction representing that the required torque is $T$ is equal to or less than the maximum torque $T_{MAX}$. In the same manner as step 312, the controller 20B selects one of the motors being kept in a lower load state relative to the other so as to provide the required torque $T$ by only a relatively low loaded motor 5B, and to permit free rotation of the other motor 4B. This means that the driving torque produced by only the motor 5B satisfies the required torque enough to keep the vehicle speed V read at step 302 at a designated constant speed based on the signal A from the sensor 11.

As appreciated from steps 308, 310, 312, and 314, the motor control described in the third embodiment is advantageous to enhance the motor efficiency and to prevent the motor from being overloaded and to avoid excessive copper loss in the winding of the motor due to a high motor temperature.

Figure 10B:
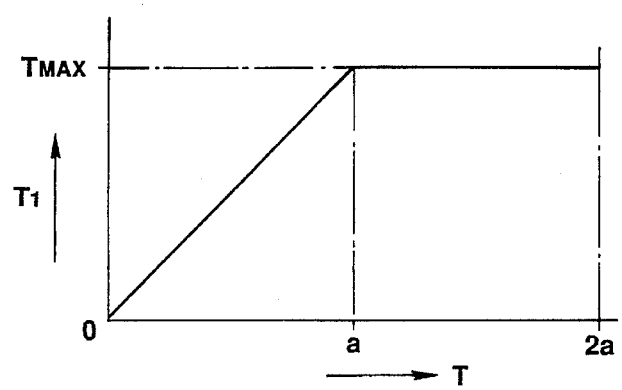
FIG. 10B is a graph illustrating a relationship between a required torque and an output torque generated by one of the two motors, when the required torque is below the maximum torque of one of the two motors.
Figure 10C:
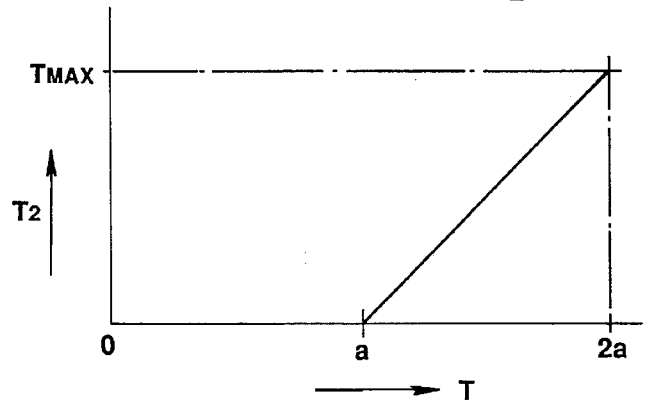
FIG. 10C is a graph illustrating a relationship between the required torque and an output torque generated by the remaining motor, when the required torque is above the maximum torque of one of the two motors.

Referring now to FIGS. 10A, 10B, and 10C, and particularly to FIG. 10A, supposing that a driving torque having a certain torque value a as exemplified by the point $P_5$ plotted on the torque characteristic curve indicated in FIG. 10A is required, the required torque T (=a) can be provided by the following two methods. According to one method, the required torque a can be provided by outputting the same torque value a/2 by means of the two motors 4B and 5B, respectively. In this case, the motor efficiency is 70% as appreciated from the torque characteristic curve of FIG. 10A. According to another method, the required torque a can be provided by outputting the entire required torque by means of one of the motors 4B and 5B, while permitting free rotation of the other motor, and as a result the motor efficiency is kept at approximately 80%. Therefore, as shown in FIGS. 10B and 10C, it is preferable that either one of the motors 4B driven until the required torque T reaches the above torque value a, and that a relatively low-loaded motor is mainly driven with the maximum output torque $T_{MAX}$ and a relatively high-loaded motor is subsidiarily driven with the under-torque $(T-T_{MAX})$ when the required torque T exceeds the torque value a. In this manner, the motor efficiency is kept at maximum in consideration of load applied to each motor, while maintaining a constant-speed travelling of the vehicle at a designated constant speed based on the signal A.

Fourth embodiment

Figure 11:
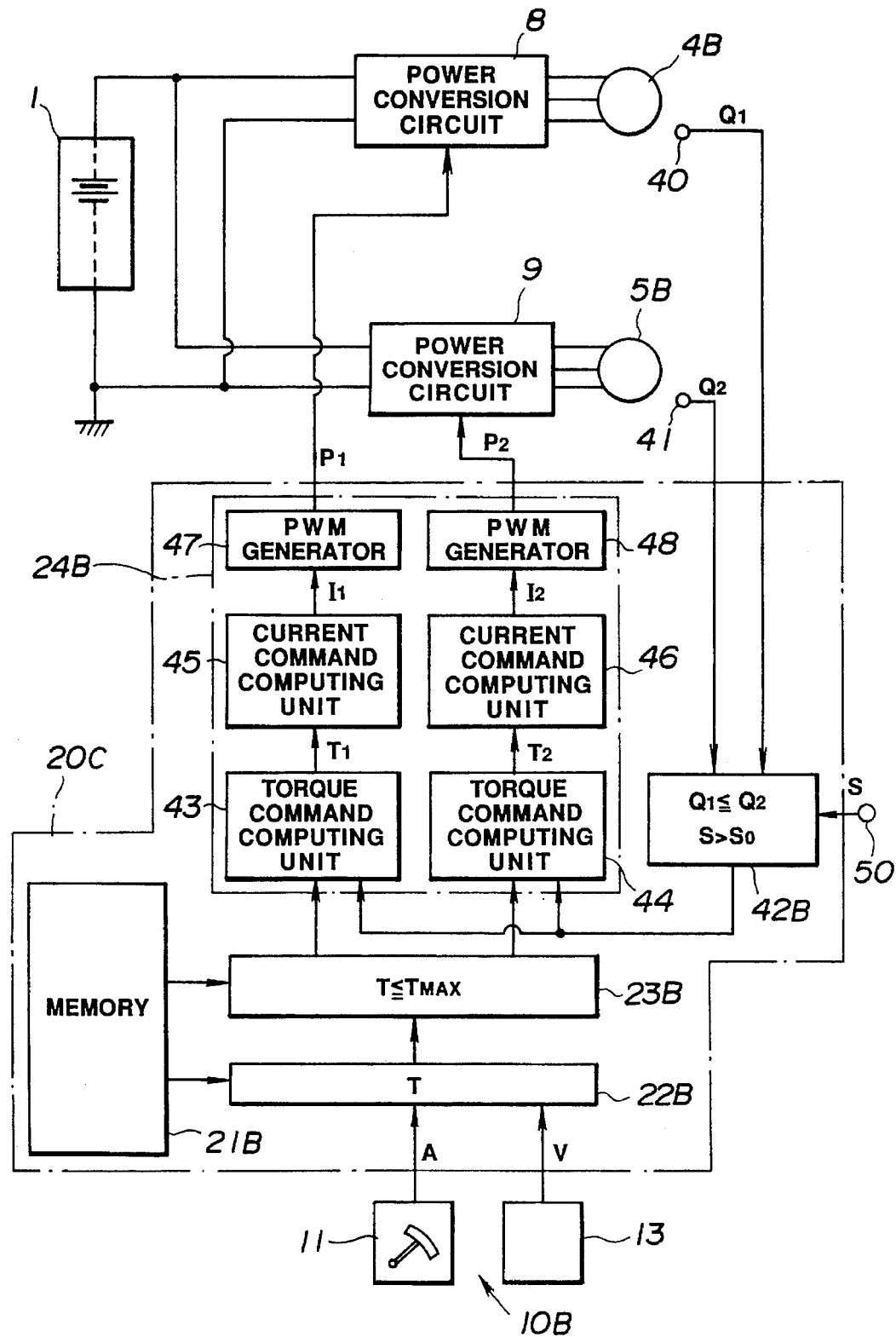
FIG. 11 is a block diagram illustrating a fourth embodiment of a wheel motor drive system for electric automobiles according to the invention.
Figure 12:
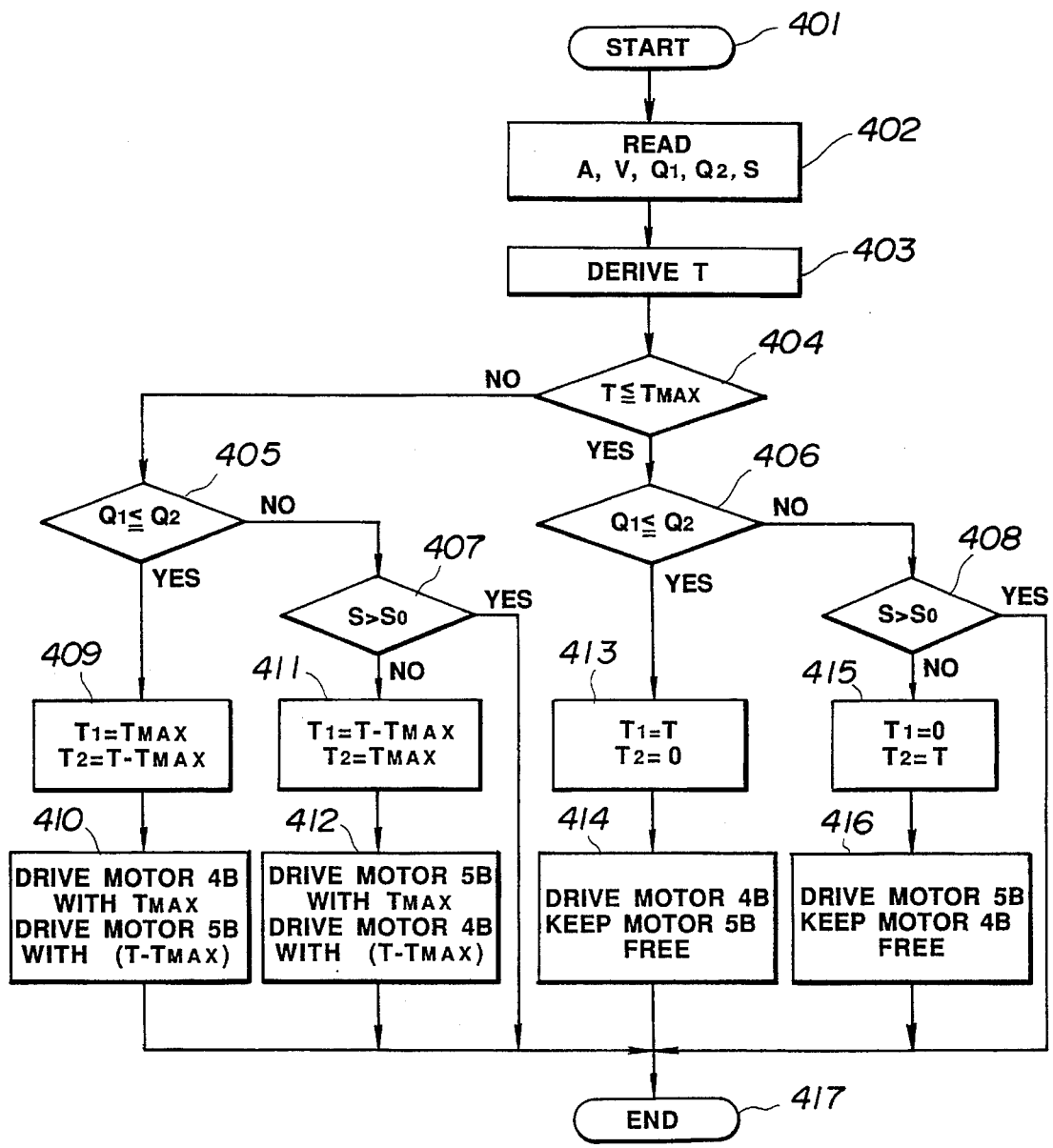
FIG. 12 is a flow chart illustrating a control procedure executed by a controller employed in the wheel motor drive system of the fourth embodiment.
Figure 13:
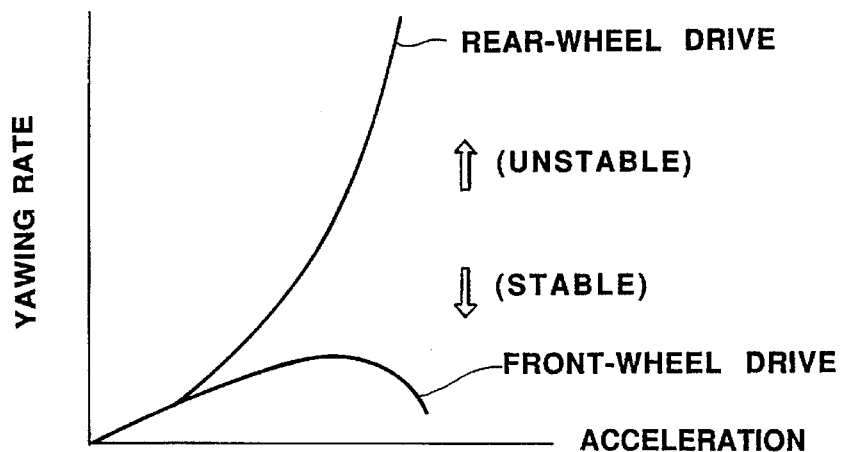
FIG. 13 is a graph illustrating a variation of yawing rate with respect to an acceleration applied to the vehicle body in the case of a front-wheel drive vehicle and in the case of a rear-wheel drive vehicle.

FIGS. 11 through 13 show the fourth embodiment of a wheel motor drive system for electric automobiles. Since the fourth embodiment is similar to the third embodiment, the same reference numerals used in the third embodiment shown in FIGS. 8 and 9 will be applied to the corresponding elements used in the fourth embodiment shown in FIGS. 11 and 12 for the purpose of comparison between the third and fourth embodiments. The fourth embodiment is different from the third embodiment in that in addition to the construction of the third embodiment, the two identical rated motors are drivingly controlled in consideration of a road surface condition monitored by a road surface condition detecting device 50 as hereinafter described in detail.

Referring now to FIG. 11, the wheel motor drive system of the fourth embodiment includes the sensing device 10B for monitoring the vehicle travelling condition, a controller 20C for controlling the same rated motors 4B and 5B. The wheel motor drive system of the fourth embodiment includes the same motor load detecting devices 40 and 41 as employed in the third embodiment. The controller 20C of the fourth embodiment receives the signals A and V so as to derive a required torque T in the same manner as the third embodiment and receives the signals $Q_1$ and $Q_2$ so as to compare the load applied to the motor 4B with the load applied to the motor 5B. The controller 20C comprises the memory 21B, the arithmetic circuit 22B, the decision circuit 23B, and the output interface 24B connected to the power conversion circuits 8 and 9, for selectively connecting one of the motors 4B and 5B to the car battery or for simultaneously connecting the motors 4B and 5B to the battery, based on the decision instruction from the decision circuit 23B. The controller 20C of the fourth embodiment also includes a comparator 42B for outputting a comparison result indicative signal to the output interface 24B by comparing a value of the first motor temperature indicative signal $Q_1$ with a value of the second motor temperature indicative signal $Q_2$. The comparator 42B is connected to the road surface condition detecting device 50, such as a road wheel slippage sensor for monitoring a slippage of the vehicle wheel on the road surface, a lateral acceleration sensor for monitoring a lateral acceleration exerted on the vehicle body, a longitudinal acceleration sensor for monitoring a longitudinal acceleration exerted on the vehicle body, a road surface condition sensor for monitoring whether the vehicle is running on a low frictional road surface and tends to skid easily, or the like. The comparator 42B receives the road surface condition indicative signal S generated from the road surface condition detecting device 50 and outputs a comparison result indicative signal to the output interface 24B by comparing a value of the signal S with a predetermined threshold value $S_o$. In the fourth embodiment, the motor 4B serves as a front-wheel drive motor, while the motor 6B serves as a rear-wheel drive motor. The operation of the wheel motor drive system of the fourth embodiment is hereinbelow described in detail in accordance with the flow chart of FIG. 12.

When the main switch is turned ON and the accelerator pedal is depressed by the driver and thus the electric automobile travels, the controller 20C is operated as follows.

In step 401, the main switch is turned ON and the accelerator-pedal depressing amount data A, the vehicle speed data V, and the first and second motor temperature indicative signal values $Q_1$ and $Q_2$ stored in the memories of the controller 20C are all initialized. Subsequently, step 402 proceeds in which the controller 20C reads out the newly detected accelerator-pedal depressing amount data A, the vehicle speed data V, the first and second motor temperature data $Q_1$ and $Q_2$, and the road surface condition indicative data S and thereafter these data A, V, $Q_1$, $Q_2$, and S are stored in the memories.

Step 403 enters in which the controller 20C derives the maximum torque $T_{MAX}$ on the basis of the renewal vehicle speed data V and the torque characteristic data $D_4$ stored in the memory 21B. In step 403, the required torque T is calculated by means of the arithmetic circuit 22B, on the basis of the two data A and $T_{MAX}$, in accordance with the previously noted equation $T=2A(T_{MAX})$.

In step 404, a test is made to determine whether the required torque T is equal to or less than the maximum torque $T_{MAX}$. If the answer to step 404 is in the negative, i.e., $T>T_{MAX}$, step 405 proceeds in which another test is made to determine whether the first motor temperature data $Q_1$ is equal to or less than the second motor temperature data $Q_2$. If the answer to step 405 is in the affirmative, i.e., $Q_1 \leq Q_2$, step 409 proceeds in which the interface 24B outputs the first command $T_1$ corresponding to a value of the maximum torque $T_{MAX}$ to the power conversion circuit 8 and the second torque command $T_2$ corresponding to a value of the under-torque $(T-T_{MAX})$ to the power conversion circuit 9, with the result that at step 410 the relatively low-loaded motor 4B is mainly driven to generate the maximum output torque $T_{MAX}$, while the relatively high-loaded motor 5B is subsidiarily driven to generate the under-torque $(T-T_{MAX})$.

In contrast to the above, if the answer to step 405 is in the negative, i.e., $Q_1 > Q_2$, step 407 proceeds in which a further test is made to determine whether the road surface condition indicative data S is greater than the predetermined threshold value $S_o$. If the answer to step 407 is in the negative, i.e., $S \leq S_o$, step 411 proceeds in which the interface 24B outputs the second command $T_2$ corresponding to the maximum torque $T_{MAX}$ to the power conversion circuit 9 and the first command $T_1$ corresponding to a value of the under-torque $(T-T_{MAX})$ to the power conversion circuit 8, with the result that at step 412 the relatively low-loaded motor 5B is mainly driven to generate the maximum torque $T_{MAX}$, while the relatively high-loaded motor 4B is subsidiarily driven to generate the under-torque $(T-T_{MAX})$. On the other hand, if the answer to step 407 is in the affirmative, i.e., $S>S_o$, the control procedure jumps to step 417 in which one cycle of the drive motor control procedure terminates.

Returning to step 404, if the answer to step 404 is in the affirmative, i.e., $T \leq T_{MAX}$, step 406 proceeds in which the same test as step 405 is made. If the answer to step 406 is in the affirmative, i.e., $Q_1 \leq Q_2$, step 413 proceeds in which the interface 24B outputs the first command $T_1$ corresponding to a value of the required torque T to the power conversion circuit 8 and the second command $T_2$ corresponding to a value of torque 0 to the power conversion circuit 9, with the result that at step 414 the power conversion circuit 8 operates to connect the motor 4B to the battery so as to supply a controlled electric power to the motor 4B and to provide the required torque by only the motor 4B, and the power conversion circuit 9 operates disconnect the motor 5B from the battery so as to prevent the power supply to the motor 5B and to permit free rotation of the motor 5B. Conversely, if the answer to step 406 is in the negative, i.e., $Q_1>Q_2$, step 408 proceeds in which the same test as step 407 is made to determine whether the road surface condition indicative data S exceeds the threshold value $S_o$. If the answer to step 408 is in the negative, i.e., $S \leq S_o$, step 415 proceeds in which the interface 24B outputs the first torque command $T_1$ corresponding to a value of torque 0 to the power conversion circuit 8 and the second torque command $T_2$ corresponding to the required torque T to the power conversion circuit 9, with the result that at step 416 the power conversion circuit 9 connect the motor 5B to the battery so as to supply a controlled electric power to the motor 5B and to provide the required torque by only the motor 5B, and the power conversion circuit 8 disconnect the motor 4B from the battery so as to prevent the power supply to the motor 4B and to permit free rotation of the motor 4B. On the other hand, if the answer to step 408 is in the affirmative, the control procedure jumps to step 417 and then one cycle of the drive motor control procedure ends. The control procedure returns from step 417 to step 401. In this manner, the previously described drive motor control procedure is repeated at a designated cycle until the main switch is turned OFF.

As set forth above, at least one of the motors is driven within a high motor efficiency range, in consideration of the load difference between the load applied to the front-wheel drive motor and the load applied to the rear-wheel drive motor, when the condition $S \leq S_o$ is satisfied, and thereby the electric automobile can economically travel at a designated constant speed based on the signal A. In contrast, the controller inhibits a particular torque distribution wherein a torque generated by the rear-wheel drive motor exceeds a torque generated by the front-wheel drive motor, when the condition $S>S_o$ is satisfied.

Referring to steps 407 and 408, the condition $S>S_o$ means that the vehicle wheels tend to skid easily on such a road surface, while the condition $S \leq S_o$ means that the vehicle wheels do not skid easily on such a road surface.

Referring to steps 410 and 412, the two identical rated motors 4B and 5B are respectively driven by the power conversion circuits 8 and 9, on the basis of the decision instruction representing that the required torque T exceeds the maximum torque $T_{MAX}$. In this case, the relatively low-loaded motor is driven with the maximum torque $T_{MAX}$, while the other motor is driven subsidiarily with the under-torque $(T-T_{MAX})$. This means that the maximum driving torque produced by only one motor does not satisfy the required torque enough to keep the vehicle speed V read at step 402 at a designated constant speed based on the accelerator pedal depressing amount indicative signal A. When the two conditions, namely $T>T_{MAX}$ and $Q_1>Q_2$ are both satisfied, the procedure advances from step 404 through step 405 to step 407. In this case, since the rear-wheel drive motor 5B can be driven mainly to provide the maximum torque $T_{MAX}$ and the front-wheel drive motor 4B can be driven subsidiarily to provide the under-torque $(T-T_{MAX})$, the comparison between the road surface condition indicative data S and the threshold value $S_o$ is made in step 407. In step 407, if the data S exceeds the threshold value $S_o$, the control procedure jumps to step 417 so as to achieve a normal motor control according to which the motors 4B and 5B are both connected through the respective power conversion circuit to the battery to provide the required torque T based on the accelerator pedal depressing amount indicative signal A, so that the motors 4B and 5B respectively provide substantially half the required torque T, for example. In step 407, assuming that the procedure advances through step 411 to step 412 under the condition of $S>S_o$, the vehicle may experience rear-end skid and consequently an undesirable oversteer on turns or an undesirable yawing during acceleration because the rear wheels first skid due to such a particular torque distribution that the torque command $T_2$ for the rear-wheel drive motor 5B is set to the maximum torque $T_{MAX}$ and the torque command $T_1$ for the front-wheel drive motor 4B is set to the under-torque $(T-T_{MAX})$ smaller than the maximum torque $T_{MAX}$. To avoid this, the control procedure jumps from step 407 to step 417, when the condition of $S>S_o$ is satisfied in step 407. In this manner, when $T>T_{MAX}$, the controller 20C of the fourth embodiment controls the two motors 4B and 5B in consideration of a motor load difference between the two motors such that the relatively low-loaded motor is driven mainly to provide the maximum torque $T_{MAX}$ and the relatively high-loaded motor is driven subsidiarily to provide the under-torque $(T-T_{MAX})$, and in consideration of a road surface condition such that the previously noted normal motor control is performed so as to avoid the rear end skid of the electric automobile when the road surface condition indicative data S, such as a wheel slippage or a friction factor of the road surface, is above the predetermined threshold value $S_o$.

Referring to steps 414 and 416, one of the two motors 4B and 5B is driven by the associated power conversion circuit with a required electric power, on the basis of the decision instruction representing that the required torque T is equal to or less than the maximum torque $T_{MAX}$. In this case, the controller 20C selects one of the motors being kept in a lower load state relative to the other so as to provide the required torque T by only the relatively low-loaded motor, and to permit free rotation of the other motor. This means that the driving torque produced by only one of the motors satisfies the required torque enough to keep the vehicle speed V read at step 402 at a designated constant speed based on the signal A. As set forth above, when the two conditions, namely $T \leq T_{MAX}$ and $Q_1>Q_2$ are both satisfied, that is, only the rear-wheel drive motor 5B can be driven to provide the required torque T and the front-wheel drive motor 4B can be kept free, the comparison between the road surface condition indicative data S and the threshold value $S_o$ is made in step 408. In step 408, if the data S exceeds the threshold value $S_o$, the control procedure jumps to step 417 so as to achieve the normal motor control. In step 408, assuming that the procedure advances through step 415 to step 416 under the condition of $S>S_o$, the vehicle may experience rear-end skid and consequently an undesirable oversteer on turns or an undesirable yawing during acceleration because the rear wheels first skid due to such a particular torque distribution that the torque command $T_2$ for the rear-wheel drive motor 5B is set to the required torque T and the torque command $T_1$ for the front-wheel drive motor 4B is set to 0 excessively smaller than the required torque T. To avoid this, the control procedure jumps from step 408 to step 417, when the condition of $S>S_o$ is satisfied in step 408. In this manner, when $T \leq T_{MAX}$, the controller 20C of the fourth embodiment drivingly controls the two motors 4B and 5B in consideration of a motor load difference between the two motors such that the relatively low-loaded motor is driven to provide the required torque T and the relatively high-loaded motor is kept free, and in consideration of a road surface condition such that the previously noted normal motor control is performed so as to avoid the rear end skid of the electric automobile when the road surface condition indicative data S is above the predetermined threshold value $S_o$.

As appreciated from the above, it is advantageous that the controller 20C employed in the wheel motor drive system of the fourth embodiment controls the two motors 4B and 5B in consideration of the road surface condition in addition to the respective load state of the two motors and the output torque characteristics of the motors, since such a motor control reduce power loss of the drive motor to insure a high motor efficiency and consequently to assure a long life of the motor and enhance a driving stability of the electric automobile.

In the front-wheel drive vehicle and the rear-wheel drive vehicle, the relationship between the yawing rate and the longitudinal acceleration is generally shown in FIG. 13. As appreciated from the graph of FIG. 13, in the case of the front-wheel drive vehicle, the yawing rate is not remarkably increased in accordance with an increase in the acceleration exerted on the vehicle body, or rather the yawing rate is gradually decreased when the acceleration exceeds a certain value. In contrast, in the case of the rear-wheel drive vehicle, the yawing rate is rapidly increased in accordance with an increase in the acceleration with regard to the driving stability during acceleration, the front-wheel drive vehicle is generally superior to the rear-wheel drive vehicle. Therefore, when the electric automobile is operated in the rear-wheel drive mode under an undesirable road surface condition, such as a low frictional road surface on which the vehicle may experience the rear-end skid, it is preferable to cancel such a rear-wheel drive mode and to shift from the rear-wheel drive mode to a normal wheel drive mode, i.e., a four-wheel drive mode, so as to enhance the driving stability of the electric automobile.

Fifth embodiment

Figure 16:
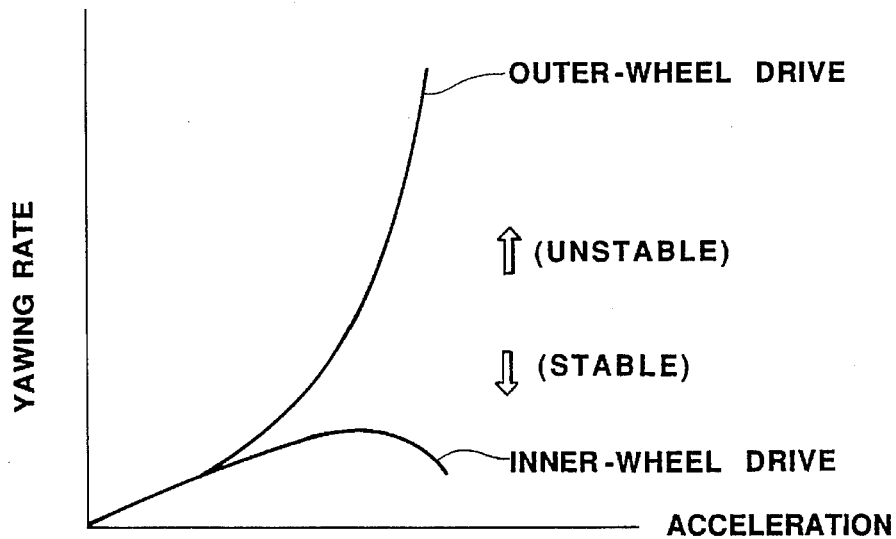
FIG. 16 is a graph illustrating a variation of yawing rate with respect to an acceleration applied to the vehicle body in the case of an inner-wheel drive arid in the case of an outer-wheel drive.
Figure 14:
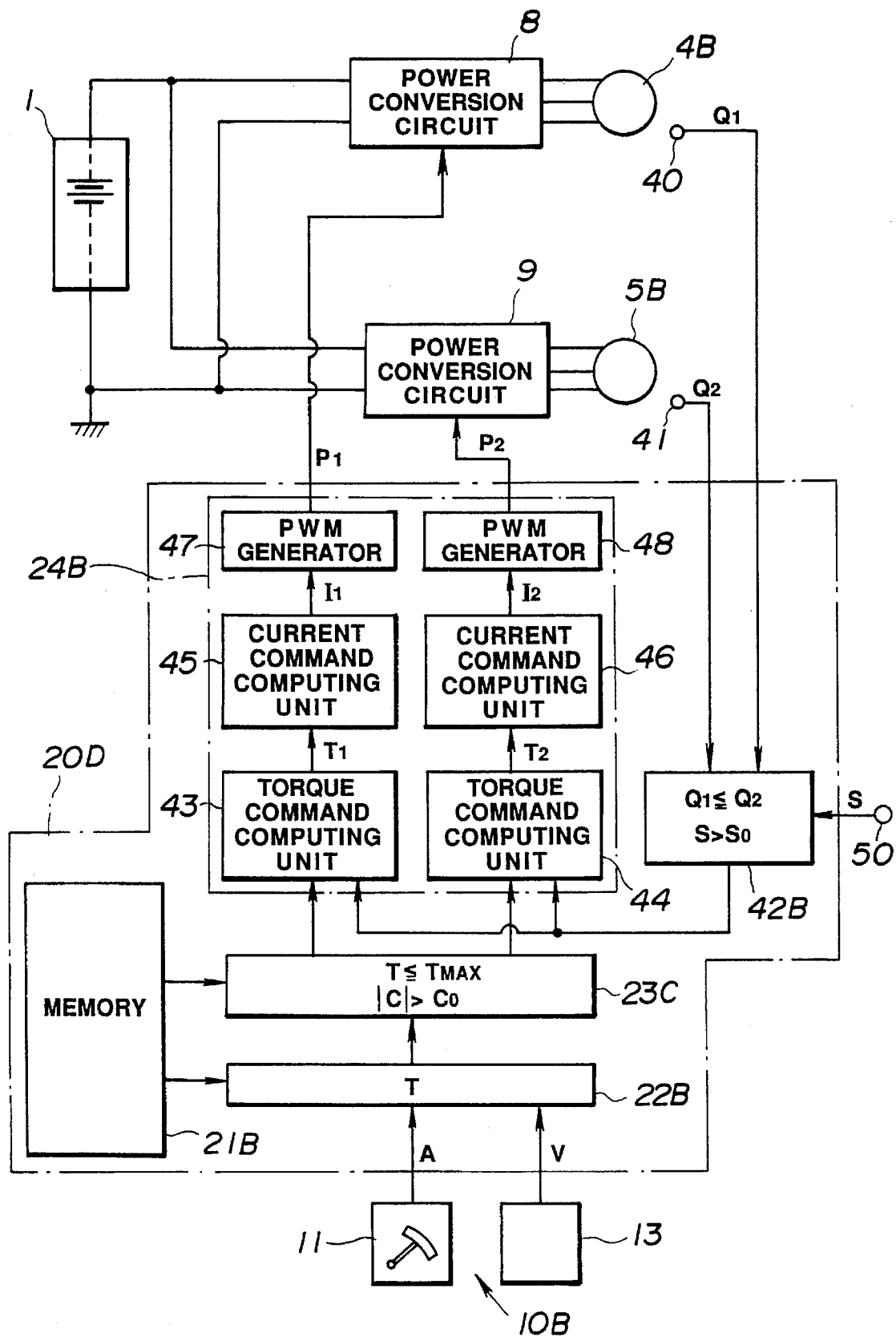
FIG. 14 is a block diagram illustrating a fifth embodiment of a wheel motor drive system for electric automobiles according to the invention.
Figure 15:
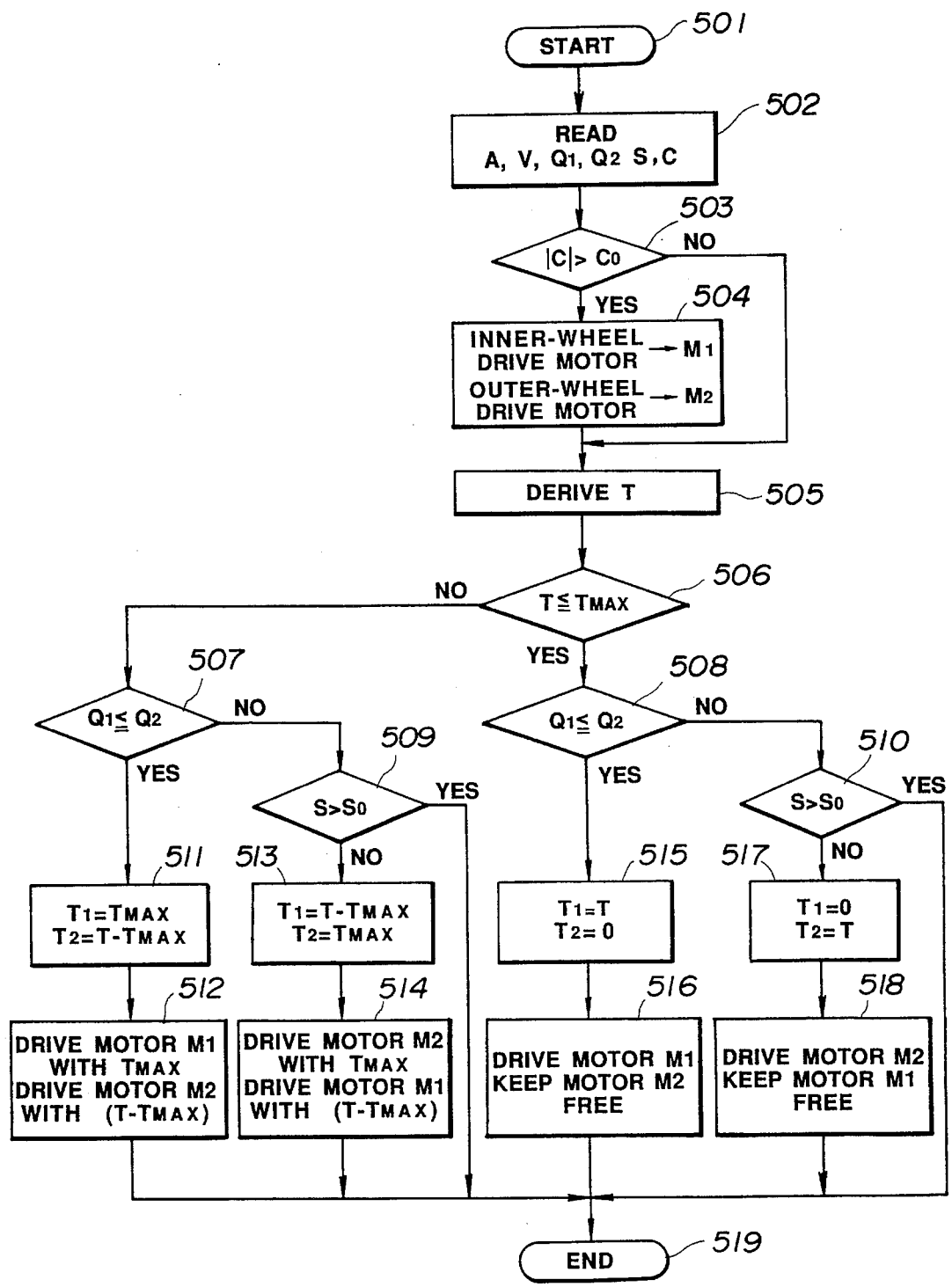
FIG. 15 is a flow chart illustrating a control procedure executed by a controller employed in the wheel motor drive system of the fifth embodiment.

FIGS. 14 through 16 show the fifth embodiment of a wheel motor drive system for electric automobiles. Since the fifth embodiment is similar to the fourth embodiment, the same reference numerals used in the fourth embodiment shown in FIGS. 11 and 12 will be applied to the corresponding elements used in the fifth embodiment shown in FIGS. 14 and 15 for the purpose of comparison between the fourth and fifth embodiments. The fifth embodiment is different from the fourth embodiment that in addition to the construction of the fourth embodiment, the two identical rated motors are controlled in consideration of a steering angle monitored by a steering angle sensor 60 as hereinafter described in detail.

Referring now to FIG. 14, the wheel motor drive system of the fifth embodiment includes the sensing device 10B, a controller 20D for controlling the identical rated motors 4B and 5B. The controller 20D of the fifth embodiment receives the signals A and V so as to derive a required torque T in the same manner as the fourth embodiment and receives the signals $Q_1$ and $Q_2$ so as to compare the load applied to the motor 4B with the load applied to the motor 5B. In addition to the construction of the controller 20C of the fourth embodiment, the controller 20D of the fifth embodiment also includes a decision circuit 23C connected to the memory 21B, to the arithmetic circuit 22B, and to the steering angle sensor 60 for monitoring a steering angle of the vehicle to output a steering angle indicative signal C. The decision circuit 23C is provided for determining whether the required torque T derived by the arithmetic circuit 22B is equal to or greater than the maximum torque $T_{MAX}$ derived from the memory to generate a first decision instruction representative of the relationship between the required torque T and the maximum torque $T_{MAX}$, and for determining a turning direction of the vehicle and a degree of turn of the vehicle, based on the steering angle indicative signal C, to generate a second decision instruction representative of the turning degree and the turning direction of the vehicle. The decision circuit 23C determines the turning degree of the vehicle by comparing the absolute value of the steering angle indicative signal C with a predetermined criterion $C_o$. In the fifth embodiment, the motors 4B and 5B serve as right and left wheel drive motors. The controller 20D of the fifth embodiment is operated in accordance with the flow chart of FIG. 15.

In step 501, the main switch is turned ON and the accelerator-pedal depressing amount data A, the vehicle speed data V, and the first and second motor temperature indicative signal values $Q_1$ and $Q_2$ stored in the memories of the controller 20D are all initialized.

In step 502, the controller 20D read out the newly detected accelerator-pedal depressing amount data A, the vehicle speed data V, the first and second motor temperature data $Q_1$ and $Q_2$, the road surface condition indicative data S, and the steering angle data C, to store these data in the memories thereof.

In step 503, the controller determines whether the vehicle is turned to the right or left, on the basis of the steering angle data C monitored by the sensor 60. The condition of $|C|>C_o$ means that the vehicle is turned to the right or left. The condition of $|C| \leq C_o$ means that the vehicle is in a straight-ahead driving state. When the answer to step 503 is in the affirmative, i.e., the vehicle is turned, step 504 proceeds in which the turning direction of the vehicle is determined on the basis of the second decision instruction from the decision circuit 23C and the inner-wheel drive motor is designated as a motor M1, while the outer-wheel drive motor is designated as a motor M2.

In step 505, the controller 20D derives the maximum torque $T_{MAX}$ on the basis of the renewal vehicle speed data V and the torque characteristic data $D_4$ stored in the memory 21B. Furthermore, the arithmetic circuit 22B of the controller 20D calculates the required torque T on the basis of the two data A and $T_{MAX}$, in accordance with the equation $T=2A(T_{MAX})$.

In step 506, a test is made to determine whether the required torque T is equal to or less than the maximum torque $T_{MAX}$. If the answer to step 506 is in the negative, i.e., $T>T_{MAX}$, step 507 proceeds in which another test is made to determine whether the first motor, temperature data $Q_1$ is equal to or less than the second motor temperature data $Q_2$. In the fifth embodiment, the first motor temperature $Q_1$ corresponds to a temperature of the rotor of the inner-wheel drive motor M1, while the second motor temperature $Q_2$ corresponds to a temperature of the rotor of the outer-wheel drive motor M2. If the answer to step 507 is in the affirmative, i.e., $Q_1 \leq Q_2$, step 511 proceeds in which the output interface 24B outputs the first command $T_1$ corresponding to a value of the maximum torque $T_{MAX}$ to the power conversion circuit associated with the inner-wheel drive motor M1 an the second torque command $T_2$ corresponding to a value of the under-torque $(T-T_{MAX})$ to the power conversion circuit associated with the outer-wheel drive motor M2, with the result that at step 512 the relatively low-loaded motor M1 is mainly driven to generate the maximum torque $T_{MAX}$, while the relatively high-loaded motor M2 is subsidiarily driven to generate the under-torque $(T-T_{MAX})$.

In contrast to the above, if the answer to step 507 is in the negative, i.e., $Q_1>Q_2$, step 509 proceeds in which a further test is made to determine whether the road surface condition indicative data S is greater than the predetermined threshold value $S_o$. If the answer to step 509 is in the negative, i.e., $S \leq S_o$, step 513 proceeds in which the interface 24B outputs the second command $T_2$ corresponding to the maximum torque $T_{MAX}$ to the power conversion circuit associated with the outer-wheel drive motor M2 and the first command $T_1$ corresponding to the under-torque $(T-T_{MAX})$ to the power conversion circuit associated with the inner-wheel drive motor M1, with the result that at step 514 the relatively low-loaded motor M2 is mainly driven to generate the maximum torque $T_{MAX}$, while the relatively high-loaded motor M1 is subsidiarily driven to generate the under-torque $(T-T_{MAX})$. On the other hand, if the answer to step 509 is in the affirmative, i.e., $S>S_o$, the control procedure skips to step 519 in which one cycle of the drive motor control procedure ends.

Returning to step 506, if the answer to step 506 is in the affirmative, i.e., $T \leq T_{MAX}$, step 508 proceeds in which the same test as step 507 is made to compare the first motor temperature data $Q_1$ with the second motor temperature data $Q_2$. If the answer to step 508 is in the affirmative, i.e., $Q_1 \leq Q_2$, step 515 proceeds in which the interface 24B outputs the first command $T_1$ corresponding to a value of the required torque T to the power conversion circuit associated with the inner-wheel drive motor M1 and the second command $T_2$ corresponding to a value of torque 0 to the power conversion circuit associated with the outer-wheel drive motor, with the result that at step 516 the power conversion circuit for the inner-wheel drive motor T1 operates to connect the motor M1 to the battery so as to supply a controlled electric power to the motor M1 and to provide the required torque by only the motor M1, and the power conversion circuit for the outer-wheel drive motor M2 operates to disconnect the motor M2 from the battery so as to prevent the power supply to the motor M2 and to permit free rotation of the motor M2. Conversely, if the answer to step 508 is in the negative, i.e., $Q_1>Q_2$, step 510 proceeds in which the same test as step 509 is made to judge the road surface condition. If the answer to step 510 is in the negative, i.e., $S \leq S_o$, step 517 proceeds in which the interface 24B outputs the first torque command $T_1$ corresponding to a value of torque 0 to the power conversion circuit associated with the inner-wheel drive motor M1 and the second torque command $T_2$ corresponding to the required torque T to the power conversion circuit associated with the outer-wheel drive motor M2, with the result that at step 518 the power conversion circuit for the outer-wheel drive motor M2 connect the motor M2 to the battery so as to supply controlled electric power to the motor M2 and to provide the required torque by only the motor M2, and the power conversion circuit associated with the inner-wheel drive motor M1 disconnect the motor M1 from the battery so as to prevent the power supply to the motor M1 and to permit free rotation of the motor M1. On the other hand, if the answer to step 510 is in the affirmative, i.e., $S>S_o$, the control procedure skips to step 519 and then one cycle of the drive motor control procedure terminates. Returning to step 503, if the answer to step 503 is in the negative, i.e., the condition of $|C| \leq C_o$ is satisfied with the result that the controller determines that the vehicle is in a straight-ahead driving state, the control procedure skips from the step 503 to step 505. The control procedure of steps 505 through step 519, executed by the controller 20D of the fifth embodiment is similar to the control procedure of steps 404 through 417, executed by the controller 20C of the fourth embodiment. The control procedure returns from step 519 to step 501. In this manner, the previously described drive motor control procedure is repeated at a designated cycle until the main switch is turned OFF.

Referring to steps 512 and 514, each of the two identical rated motors M1 and M2 is driven by the associated one of the power conversion circuits 8 and 9, on the basis of the first decision instruction representing that the required torque T exceeds the maximum torque $T_{MAX}$. In this case, the relatively low-loaded motor is mainly driven with the maximum torque $T_{MAX}$, while the relatively high-loaded motor is subsidiarily driven with the under-torque $(T-T_{MAX})$. This means that the maximum driving torque produced by only one motor does not satisfy the required torque enough to keep the vehicle speed V read at step 502 at a designated constant speed based on the accelerator pedal depressing amount indicative signal A. When the two conditions, namely $T>T_{MAX}$ and $Q_1>Q_2$ are both satisfied, the procedure advances from step 506 through step 507 to step 509. In this case, since the outer-wheel drive motor M2 can be driven mainly to provide the maximum torque $T_{MAX}$ and the inner-wheel drive motor T1 can be driven subsidiarily to provide the under-torque $(T-T_{MAX})$, the comparison between the road surface condition indicative data S and the threshold value $S_o$ is made in step 509. In step 509, if the data S exceeds the threshold value $S_o$, the control procedure jumps to step 519 so as to achieve a normal motor control according to which the motors 4B and 5B are both connected through the respective power conversion circuit to the battery to provide the required torque T based on the accelerator pedal depressing amount indicative signal A, so that the motors 4B and 5B respectively provide substantially half the required torque T, for example. In step 509, assuming that the procedure advances through step 513 to step 514 under the condition of $S>S_o$, the vehicle may experience outer-wheel skid and consequently an undesirable high yawing rate on turns because the outer wheels first skid due to such a particular torque distribution that the torque command $T_2$ for the outer-wheel drive motor M2 is set to the maximum torque $T_{MAX}$ and the torque command $T_1$ for the inner-wheel drive motor M1 is set to the under-torque $(T-T_{MAX})$ smaller than the maximum torque $T_{MAX}$. To avoid this, the control procedure jumps from step 509 to step 519, when the condition of $S>S_o$ is satisfied in step 509. In this manner, when $T>T_{MAX}$, the controller 20D of the fifth embodiment controls the two motors M1 and M2 in consideration of a motor load difference between the two motors such that the relatively low-loaded motor is driven mainly to provide the maximum torque $T_{MAX}$ and the relatively high-loaded motor is driven subsidiarily to provide the under-torque $(T-T_{MAX})$, and in consideration of a road surface condition such that the previously noted normal motor control is performed so as to avoid the outer-wheel skid of the electric automobile when the road surface condition indicative data S, such as a wheel slippage or a friction factor of the road surface, is above the predetermined threshold value $S_o$.

Referring to steps 516 and 518, one of the two motors M1 and M2 is driven by the associated power conversion circuit with a required electric power, on the basis of the first decision instruction representing that the required torque T is equal to or less than the maximum torque $T_{MAX}$. In this case, the controller 20D selects one of the motors being kept in a lower load state relative to the other so as to provide the required torque T by only the relatively low-loaded motor, and to permit free rotation of the other motor. This means that the driving torque produced by only one of the motors satisfies the required torque enough to keep the vehicle speed V read at step 502 at a designated constant speed based on the signal A. As set forth above, when the two conditions, namely $T \leq T_{MAX}$ and $Q_1 > Q_2$ are both satisfied, that is, only the outer-wheel drive motor M2 can be driven to provide the required torque T and the inner-wheel drive motor M1 can be kept free, the comparison between the road surface condition indicative data S and the threshold value $S_o$ is made in step 510. In step 510, if the data S exceeds the threshold value $S_o$, the control procedure jumps to step 519 so as to achieve the normal motor control. In step 510, assuming that the procedure advances through step 517 to step 518 under the condition of $S > S_o$, the vehicle may experience outer-wheel skid and consequently an undesirable high yawing rate on turns because the outer wheels first skid due to such a particular torque distribution that the torque command $T_2$ for the outer-wheel drive motor M2 is set to the required torque T and the torque command $T_1$ for the inner-wheel drive motor M1 is set to 0 excessively smaller than the required torque T. To avoid this, the control procedure jumps from step 510 to step 519, when the condition of $S > S_o$ is satisfied in step 510. In this manner, when $T \leq T_{MAX}$, the controller 20D of the fifth embodiment controls the two motors M1 and M2 in consideration of a motor load difference between the two motors such that the relatively low-loaded motor is driven to provide the required torque T and the relatively high-loaded motor is kept free, and in consideration of a road surface condition such that the previously noted normal motor control is performed so as to avoid the outer-wheel skid of the electric automobile when the road surface condition indicative data S is above the predetermined threshold value $S_o$.

In this manner, at least one of the motors is driven within a high motor efficiency range, in consideration of the load difference between the load applied to the left-wheel drive motor and the load applied to the right-wheel drive motor, when the condition $S \leq S_o$ is satisfied, and thereby the electric automobile can be economically turned at a designated constant speed based on the signal A. In contrast, the controller inhibits a particular torque distribution wherein a torque generated by the outer-wheel drive motor exceeds a torque generated by the inner-wheel drive motor, when the condition $S \leq S_o$ is satisfied.

As appreciated from the above, it is advantageous that the controller 20D employed in the wheel motor drive system of the fifth embodiment controls the two motors 4B and 5B in consideration of the turning direction of the vehicle in addition to the road surface condition, the respective load state of the two motors, and the output torque characteristics of the motors, since such a motor control reduce power loss of the drive motor to insure a high motor efficiency and consequently to assure a long life of the motor and to enhance both a driving stability and a cornering stability of the electric automobile.

In the outer-wheel drive vehicle and the inner-wheel drive vehicle, the relationship between the yawing rate and the longitudinal acceleration is generally shown in FIG. 16 As appreciated from the graph of FIG. 16, in the case of the inner-wheel drive vehicle, the yawing rate is not remarkably increased in accordance with an increase in the acceleration exerted on the vehicle body, or rather the yawing rate is gradually decreased when the acceleration exceeds a certain value. In contrast, in the case of the outer-wheel drive vehicle, the yawing rate is rapidly increased in accordance with an increase in the acceleration. In other words, the inner-wheel drive vehicle is generally superior to the outer-wheel drive vehicle with regard to the driving stability during acceleration. Therefore, when the electric automobile is operated in the outer-wheel drive mode under an undesirable road surface condition, such as a low frictional road surface on which the vehicle may experience the outer-wheel skid, it is preferable to cancel such an outer-wheel drive mode and to shift from the outer-wheel drive mode to a normal turning control routine according to which a proper differential operation is achieved depending on the degree of turning of the vehicle, so as to enhance both the driving stability and the cornering stability of the electric automobile, even on the low frictional road surface.

While the foregoing is a description of the preferred embodiments for carrying out the invention, it will be understood that the invention is not limited to the particular embodiments shown and described herein, but that various changes and modifications may be made without departing from the scope or spirit of this invention as defined by the following claims.

What is claimed is:

1. A drive system for an electric automobile using a battery, comprising:

at least two electric motors connected to vehicle wheels independently of each other;

sensor means for monitoring a vehicle travelling condition;

means for deriving a required driving torque to be generated by said motors on the basis of said monitored vehicle travelling condition; and control means responsive to the magnitude of said required torque, for controlling said motors at a low power consumption mode wherein an electric power supply to each of said motors is controlled so that said motors are driven to generate said required torque within a highest possible motor efficiency range, wherein said control means includes decision means for comparing said required torque with a maximum torque of each of the motors and command means for controlling said electric power supply to each motor based on comparison results from said decision means and for operating at least one of said motors which would provide the highest possible motor efficiency at said required torque.

2. A drive system for an electric automobile using a battery, comprising:

at least two electric motors connected to vehicle wheels independently of each other, each of said motors having inherent torque characteristics with regard to a rotational speed and a maximum torque;

sensor means for monitoring a vehicle travelling condition;

memory means for storing torque characteristic data representative of said torque characteristics of said motors;

means for deriving a required driving torque to be generated by said motors on the basis of said monitored vehicle travelling condition and said torque characteristic data; and control means responsive to the magnitude of said required torque, for controlling said motors at a low power consumption mode wherein an electric power supply to each of said motors is controlled so that said motors are driven to generate said required torque within a highest possible motor efficiency range, wherein said control means includes decision means for comparing said required torque with a maximum torque of each of the motors and command means for controlling said electric power supply to each motor based on comparison results from said decision means and for operating at least one of said motors which would provide the highest possible motor efficiency at said required torque.

3. A wheel motor drive system for an electric automobile using a car battery, comprising:

a front-wheel drive motor having a driving connection with a front vehicle wheel;

a rear-wheel drive motor having a driving connection with a rear vehicle wheel, torque characteristics of said rear-wheel drive motor being different from those of said front-wheel drive motor;

sensor means for monitoring a vehicle travelling condition;

memory means for storing torque characteristic data representative of said torque characteristics of said motors;

means for deriving a required driving torque to be generated by said motors on the basis of said monitored vehicle travelling condition and said torque characteristic data;

control means responsive to the magnitude of said required torque, for controlling said motors at a low power consumption mode wherein an electric power supply to each of said motors is controlled so that said motors are driven to generate said required torque within a highest motor possible efficiency range; and said control means selecting one of three motor drive modes comprising a first drive mode wherein only said rear-wheel drive motor is driven, a second drive mode wherein only said front-wheel drive motor is driven, and a third drive mode wherein both said front-wheel and rear-wheel drive motors are driven simultaneously with each other, wherein said control means includes decision means for comparing said required torque with a maximum torque of each of the motors and command means for controlling said electric power supply to each motor based on comparison results from said decision means and for operating at least one of said motors which would provide the highest possible motor efficiency range at said required torque, wherein one of said motors is a high-power motor and the other is a low-power motor, and said command means provides said first drive mode when said required torque is less than a maximum torque of said low-power motor, said second drive mode when said required torque is equal to or greater than the maximum torque of said low-power motor and less than a maximum torque of said high-power motor, and said third drive mode when said required torque is equal to or greater than the maximum torque of said high-power motor.

4. The wheel motor drive system as set forth in claim 3, wherein said sensor means includes a vehicle speed sensor for monitoring a vehicle speed and an accelerator sensor for monitoring a depressing amount of an accelerator-pedal, and said deriving means derives said required torque based on said monitored accelerator-pedal depressing amount and a maximum torque generated by each of said motors at said monitored vehicle speed.

5. The wheel motor drive system as set forth in claim 3, wherein said front-wheel drive motor is said high-power motor and said rear-wheel drive motor is said low-power motor.

6. The wheel motor drive system as set forth in claim 3, wherein said rear-wheel drive motor is said high-power motor and said front-wheel drive motor is said low-power motor.

7. A wheel drive system for an electric automobile using a battery, comprising:

at least two electric motors connected to vehicle wheels independently of each other;

sensor means for monitoring a vehicle travelling condition;

means for deriving a required driving torque to be generated by said motors on the basis of said monitored vehicle travelling condition;

means for determining whether said required torque exceeds a maximum torque of each of the motors and for generating a decision instruction; and control means responsive to said decision instruction for deriving a combination of said motors necessary to provide a highest possible motor efficiency while producing said required torque and for controlling an electric power supply to each of said motors on the basis of said combination.

8. The wheel motor drive system as set forth in claim 7, wherein said control means controls the electric power supply to each motor to drive all of said motors when said means for determining outputs said decision instruction indicating that said required torque exceeds each of the maximum torque of the motors, and said control means controls the electric power supply to each motor in accordance with said combination.

9. The wheel motor drive system as set forth in claim 7, wherein said sensor means comprises a vehicle speed sensor for monitoring a vehicle speed and an accelerator sensor for monitoring a depressing amount of an accelerator-pedal, and said deriving means derives said required torque based on said accelerator-pedal depressing amount and said vehicle speed.

10. A wheel motor drive system for an electric automobile using a battery, comprising:

a front-wheel drive motor having a driving connection with a front vehicle wheel;

a rear-wheel drive motor having a driving connection with a rear vehicle wheel;

sensor means for monitoring a vehicle travelling condition;

means for deriving a required driving torque to be generated by said motors on the basis of said monitored vehicle travelling condition;

means for determining whether said required torque exceeds a maximum torque of each of the motors, and for generating a decision instruction; and control means responsive to said decision instruction for deriving a combination of said motors necessary to provide a highest possible motor efficiency while producing said required torque and for controlling an electric power supply to each of said motors on the basis of said combination, wherein one of said motors is a high-power motor and the other is a low-power motor, and said control means controls the power supply to each motor so that said both motors are driven with said high-power motor driven at its maximum torque when said required torque exceeds the maximum torque of said high-power motor, and that only said high-power motor is driven when said required torque is greater than or equal to the maximum torque of said low-power motor and less than the maximum torque of said high-power motor, and that only said low-power motor is driven when said required torque is less than the maximum torque of said low-power motor.

11. The wheel motor drive system as set forth in claim 10, wherein said front-wheel drive motor is said high-power motor and said rear-wheel drive motor is said low-power motor.

12. The wheel motor drive system as set forth in claim 10, wherein said rear-wheel drive motor is said high-power motor and said front-wheel drive motor is said low-power motor.

* * * * *